United States Patent [19]
Tibbetts

[11] Patent Number: 6,158,044
[45] Date of Patent: Dec. 5, 2000

[54] PROPOSAL BASED ARCHITECTURE SYSTEM

[75] Inventor: John J. Tibbetts, San Francisco, Calif.

[73] Assignee: ePropose, Inc., San Francisco, Calif.

[21] Appl. No.: 09/084,199

[22] Filed: May 20, 1998

Related U.S. Application Data

[60] Provisional application No. 60/047,245, May 21, 1997.

[51] Int. Cl.[7] .................................................. G06F 9/45
[52] U.S. Cl. ................................. 717/1; 707/1; 709/300
[58] Field of Search ............................................ 395/701

[56] References Cited

U.S. PATENT DOCUMENTS

| | | | |
|---|---|---|---|
| 5,084,816 | 1/1992 | Boese et al. ................................ | 714/4 |
| 5,457,797 | 10/1995 | Butterworth et al. ................... | 709/302 |
| 5,522,079 | 5/1996 | Acker et al. ................................ | 717/5 |
| 5,539,909 | 7/1996 | Tanaka et al. ........................... | 709/303 |
| 5,627,979 | 5/1997 | Chang et al. ........................... | 345/335 |

(List continued on next page.)

OTHER PUBLICATIONS

Baker, S.; "CORBA implementation issues". IEEE/IEE Electronic Library[online], IEEE Colloquium on Distributed Object Management, pp. 5/1–5/3, Jan. 1994.

Chapin et al.; "Security for the Common Object Request Broker Architecture (CORBA)". IEEE/IEE Electronic Library[online], Proceedings, 10th Annual Computer Security Application Conference, pp. 21–30, Dec. 1994.

Felber et al.; "The design of a CORBA group communication service". IEEE/IEE Electronic Library[online], Proceedings, 15th Symposium on Reliable Distributed Systems, pp. 150–159, Oct. 1996.

Object Management Group (OMG); "The common Object Request Broker: Architecture and Specification". Accessed on Jul. 28, 1999, Retrieved from the Internet:<URL:www.infosys.tuwien.ac.at/Research/Corba/OMG/cover.htm>, Jul. 1995.

Object Management Group (OMG); "CORBA facilities: Common Facilities Architecture". Accessed on Jul. 28, 1999, Retrieved from the Internet:<URL:www.omg.org>, Jan. 1994.

*Primary Examiner*—Tariq R. Hafiz
*Assistant Examiner*—Kelvin E. Booker
*Attorney, Agent, or Firm*—Coudert Brothers

[57] ABSTRACT

A proposal based architecture system that converts a transaction submission process into a generic object in a computer environment. A preferred embodiment of the invention provides a tool set which allows the user to create a set of Proposal Specifications which define the structure of the possible components of a Proposal. The user defines the complete characteristics (meta-data) for any kind of Proposal which define the hierarchy of domain relationships, interaction modes, validation references, and assumptions. The actual Proposal instance is formed using the definitions in the Proposal Specifications. A Proposal allows a user to add, change, and annotate data, is self aware and navigates between pages and skips to appropriate fields automatically and supports n-level undo/redo. It also tracks all versions of data updates and the user that is responsible for each data update, recognizes and corrects stale data, and enables long-lived transactions, off-line transaction processing, and collaborative transactions. A Proposal is accessed via multiple User Interfaces (UI), breaking the close coupling between the front-end and the back-end and allowing the user to add a Web or Graphical User Interface (GUI) front-end without having to rewrite the back-end application. A UI coordinator maps user input fields to components of the Proposal and communicates with different user interfaces such as: Internet; Graphical User Interface (GUI); Object Oriented User Interface (OOUI); proprietary interface; and devices such as bar code readers or keypads. The invention also provides a default UI and components. A set of Transaction Processing/Data Processing (TP/DP) interfaces are provided to communicate with back-end transactional interfaces such as Database Management Systems (DBMS), Transactional Processing (TP) Monitors, and Object Oriented Databases.

75 Claims, 19 Drawing Sheets

U.S. PATENT DOCUMENTS

| | | | |
|---|---|---|---|
| 5,706,500 | 1/1998 | Dzikewich et al. | 707/10 |
| 5,924,097 | 7/1999 | Hill et al. | 707/10 |
| 5,991,823 | 11/1999 | Cavanaugh, III et al. | 709/304 |
| 6,009,266 | 12/1999 | Brownell et al. | 709/303 |
| 6,009,405 | 12/1999 | Leymann et al. | 705/9 |
| 6,016,394 | 1/2000 | Walker | 717/1 |
| 6,016,490 | 1/2000 | Watanabe et al. | 707/8 |
| 6,018,627 | 1/2000 | Iyengar et al. | 717/1 |

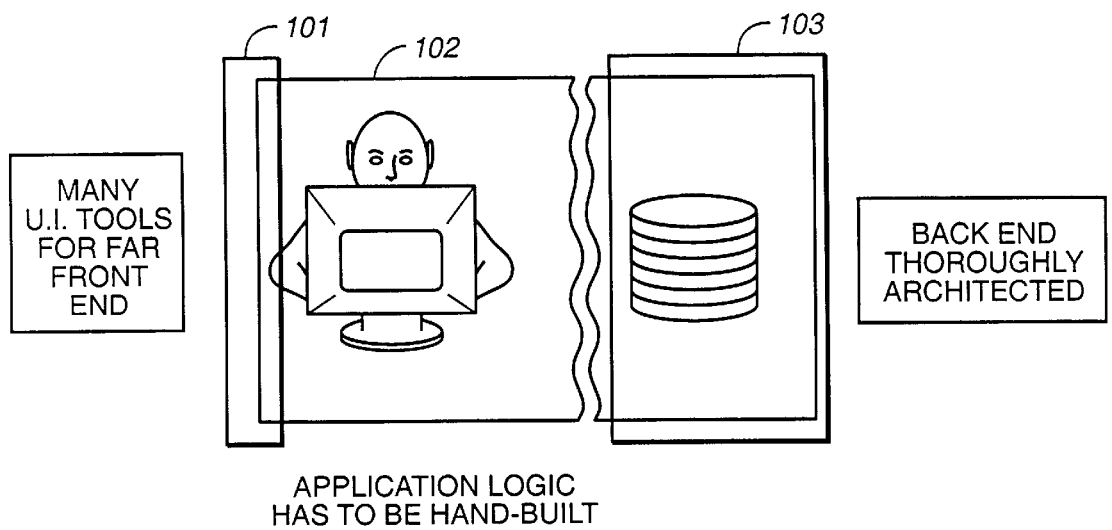
FIG._1
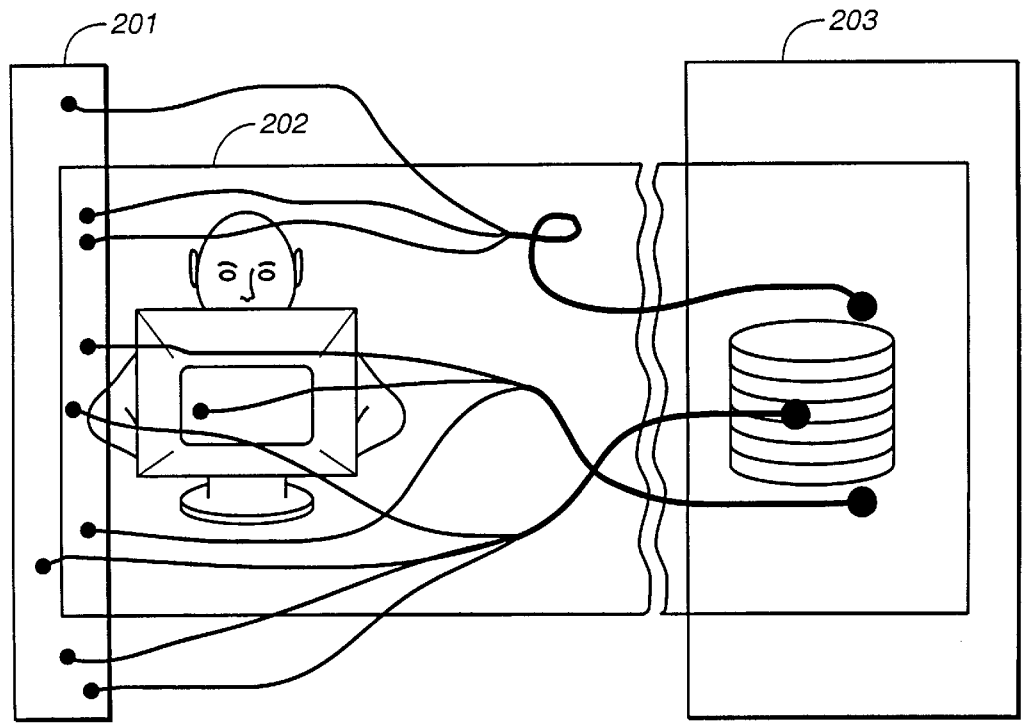
FIG._2

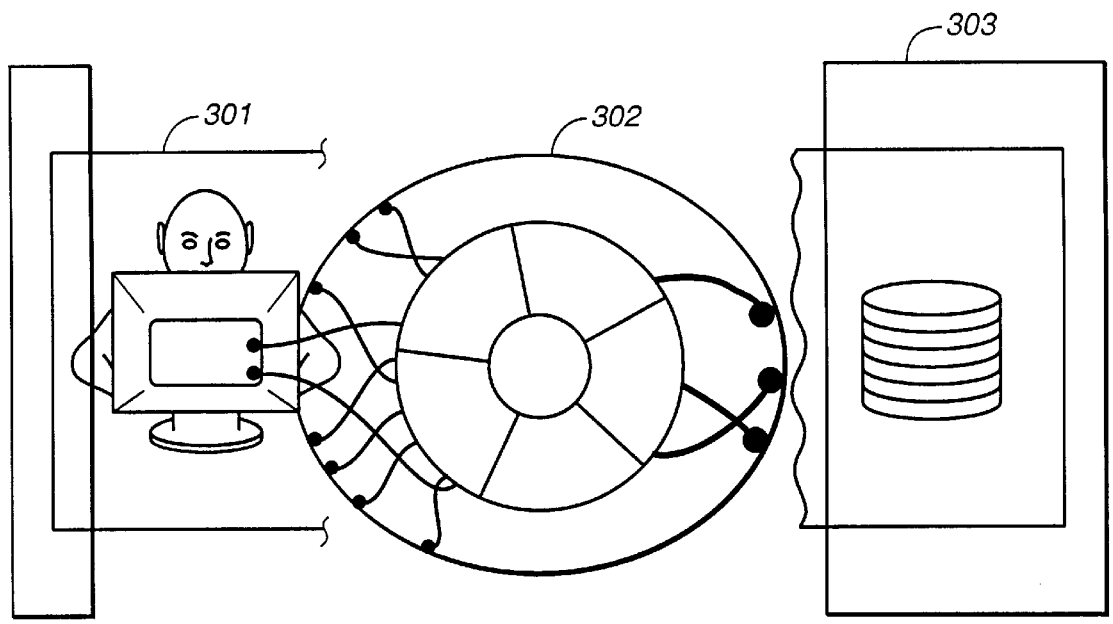
FIG._3
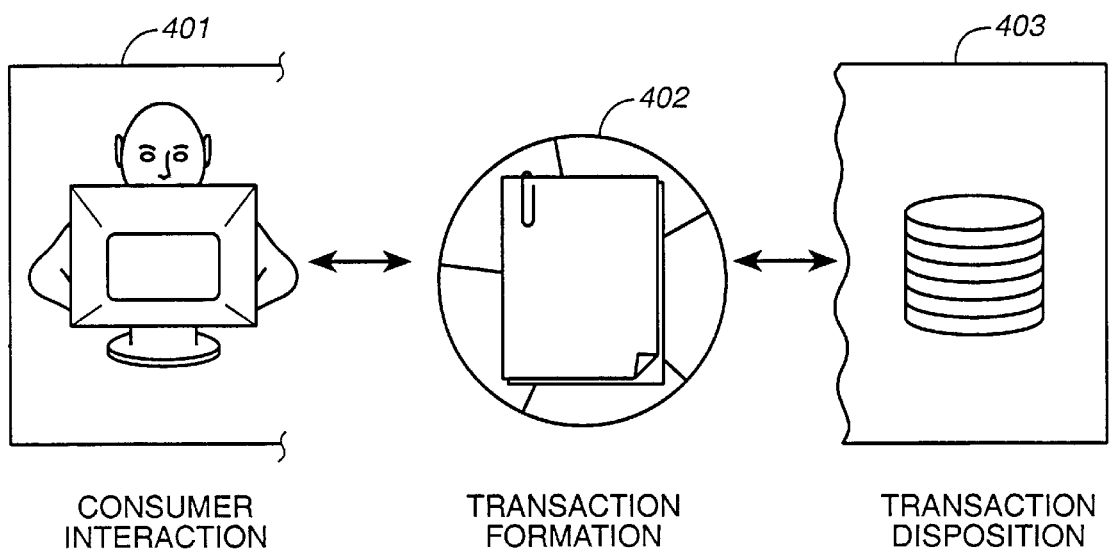
CONSUMER INTERACTION    TRANSACTION FORMATION    TRANSACTION DISPOSITION
FIG._4

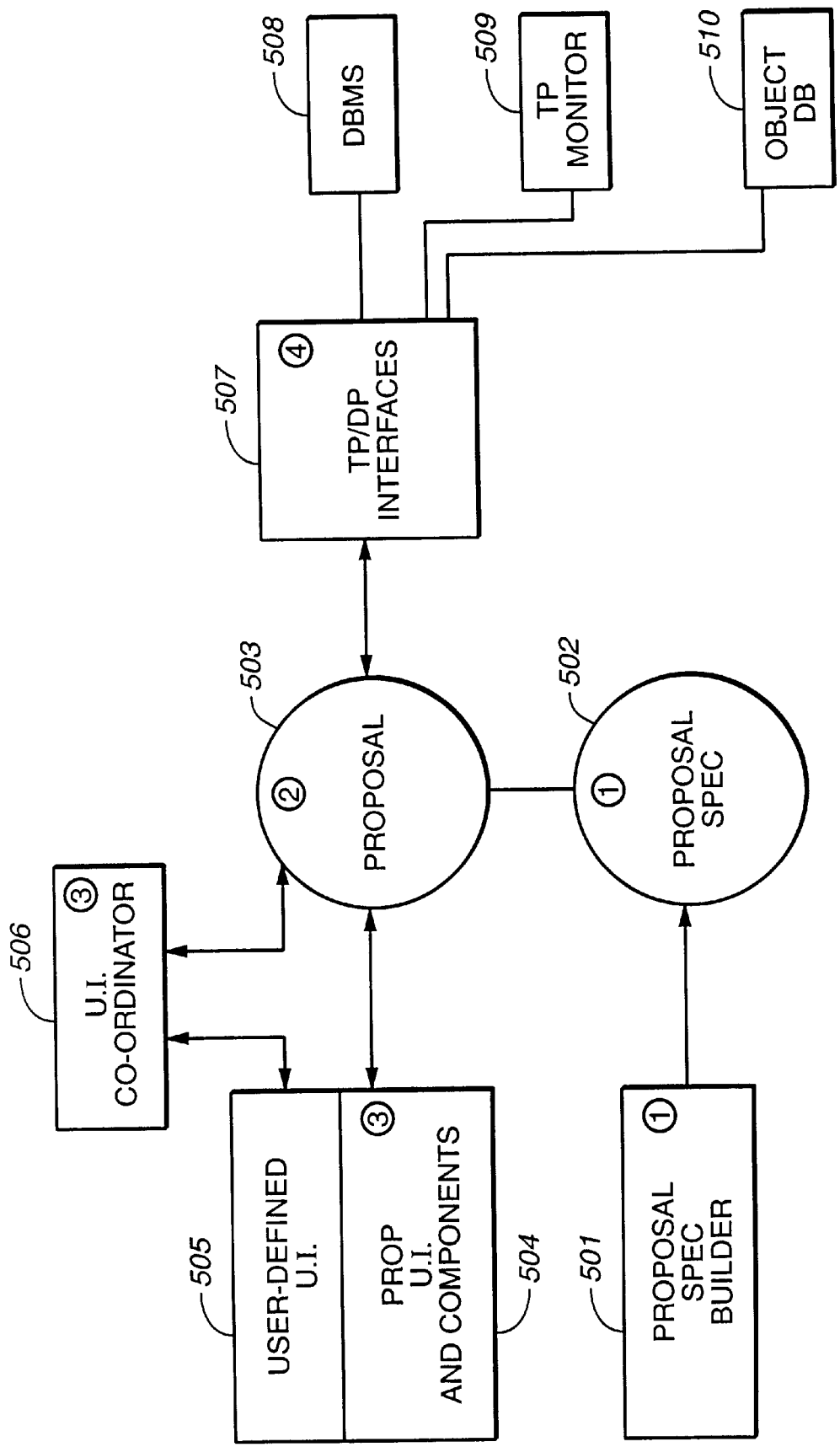
FIG._5

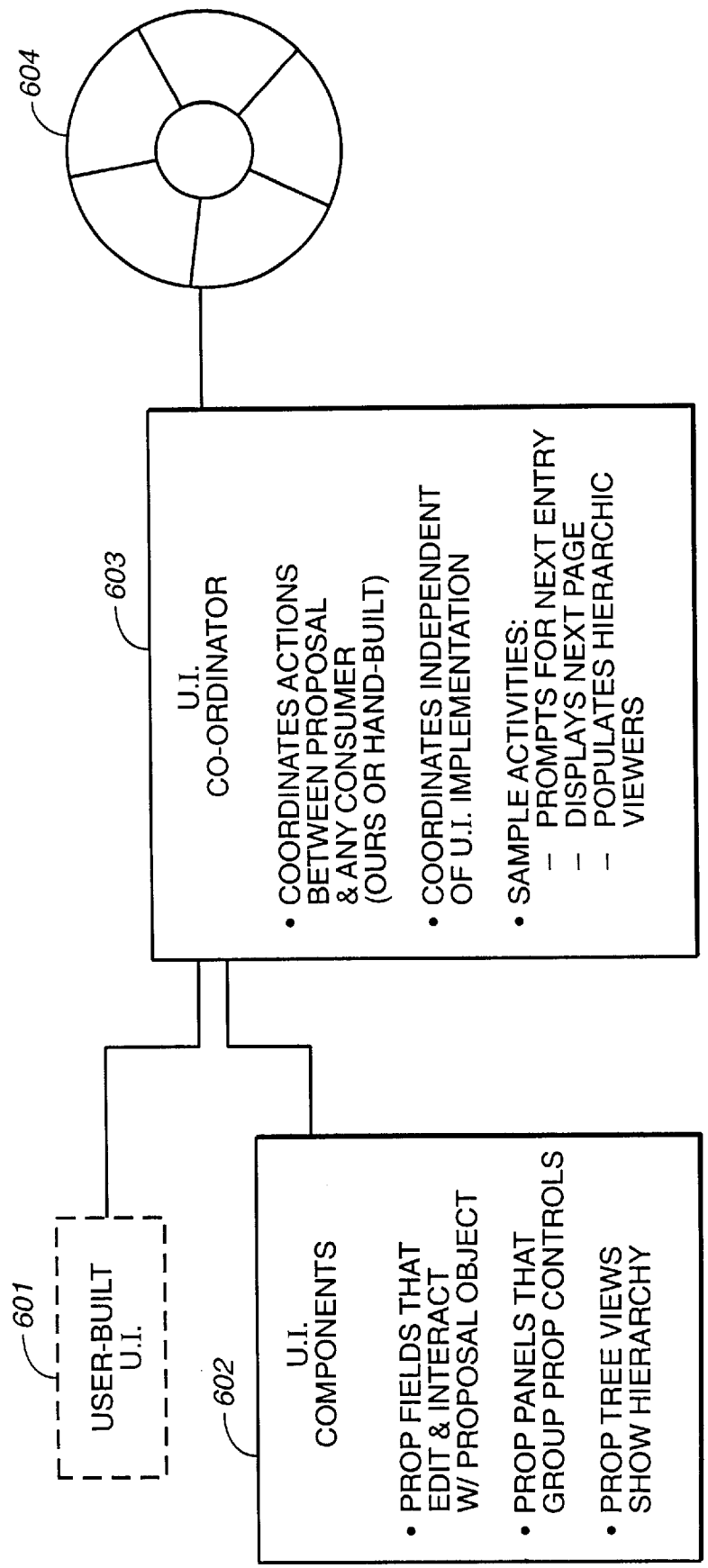
FIG._6

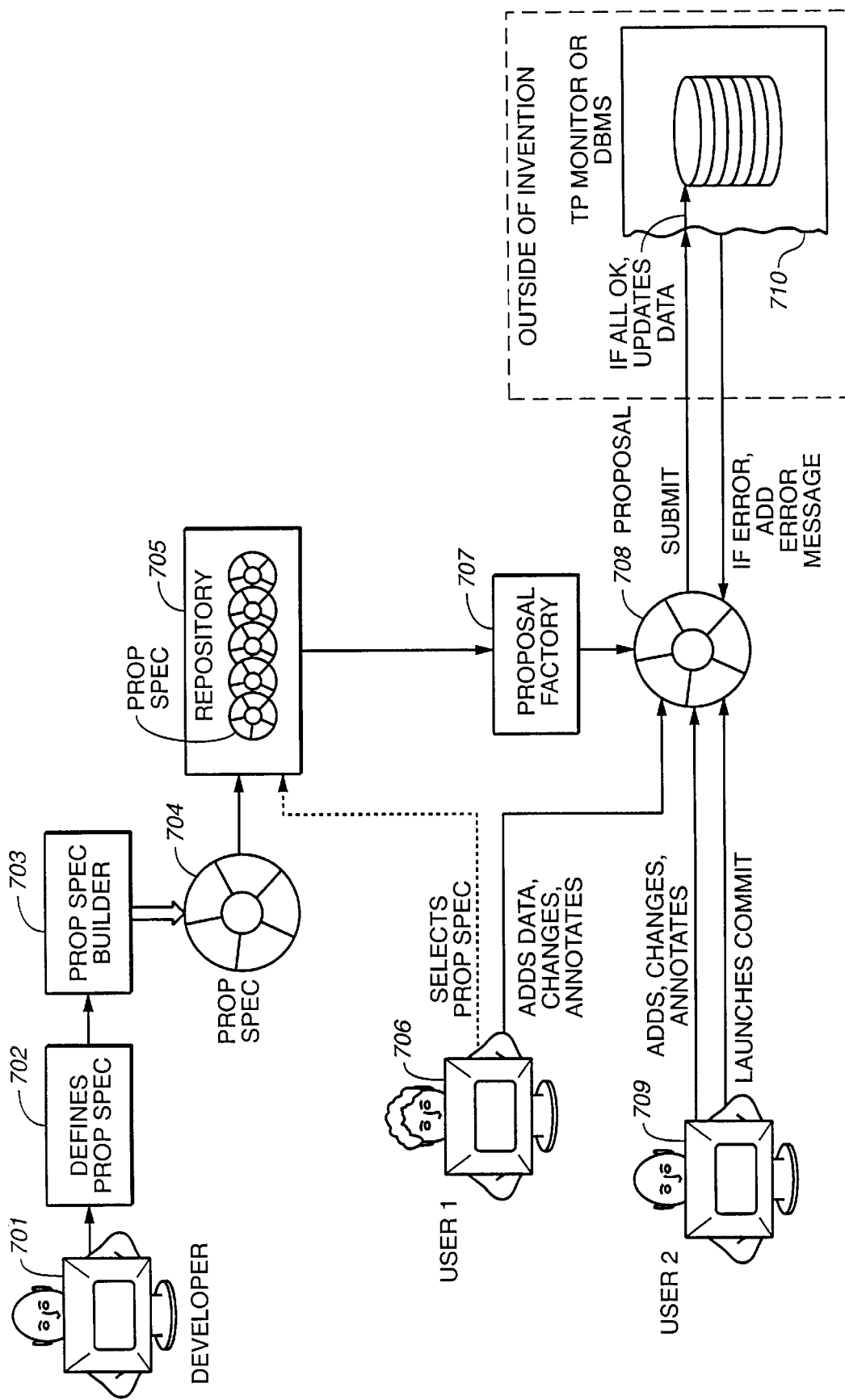
FIG._7

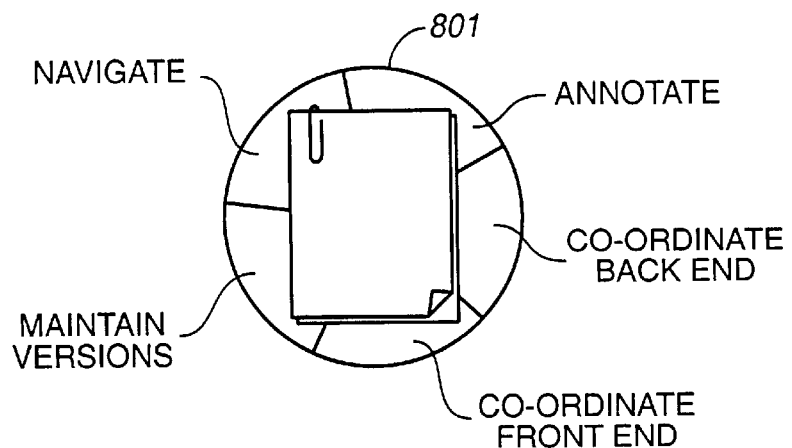
FIG._8
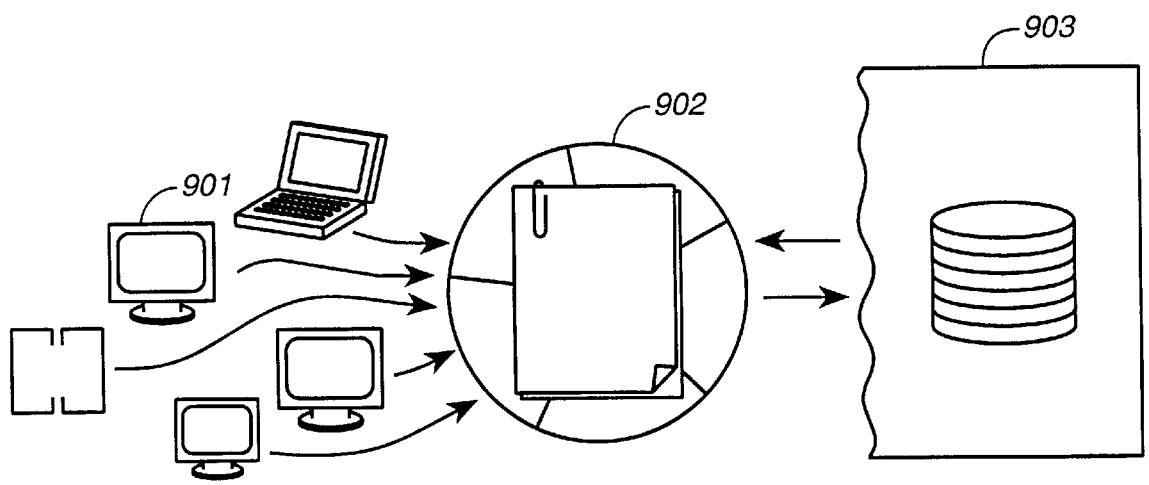
FIG._9

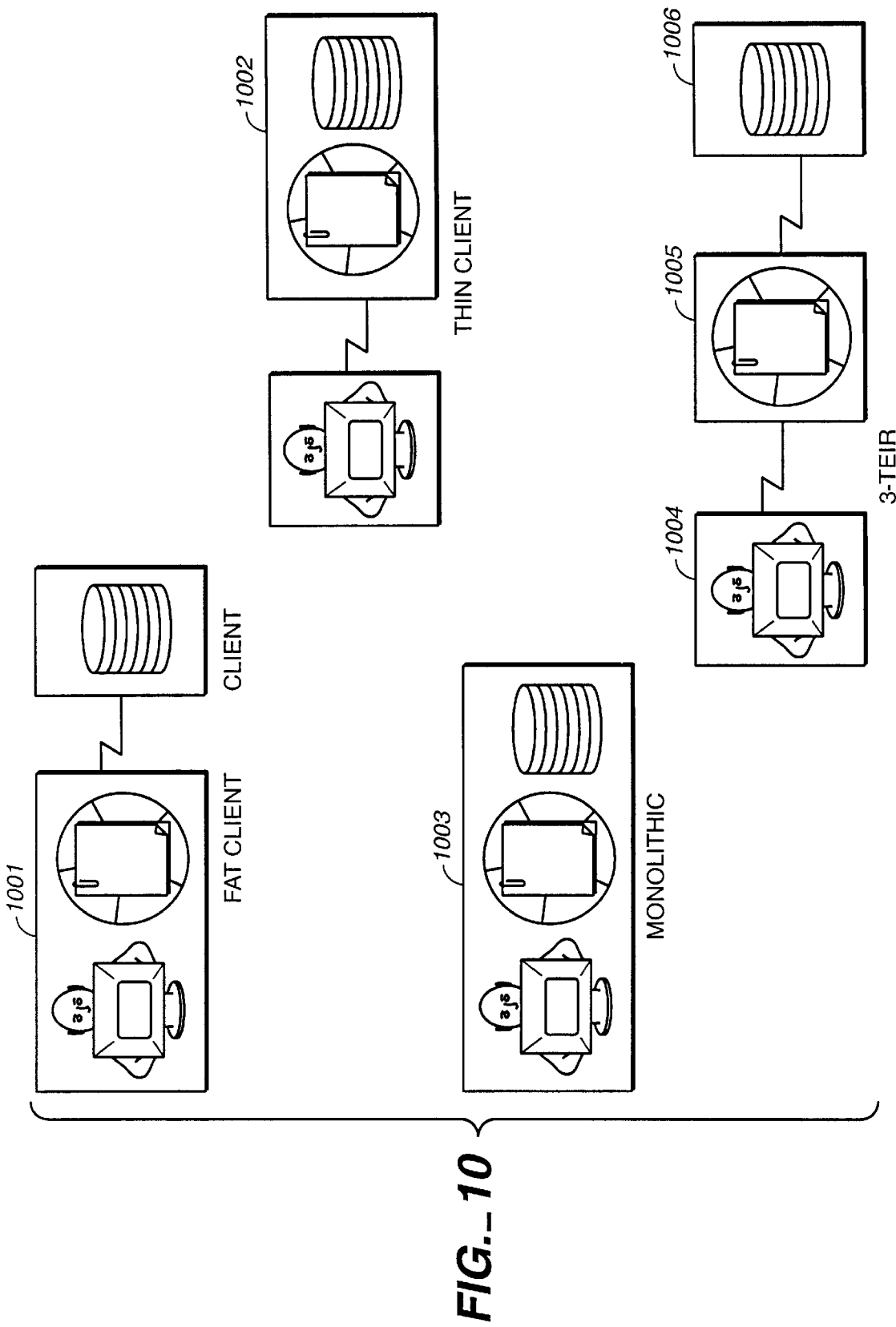
FIG._10

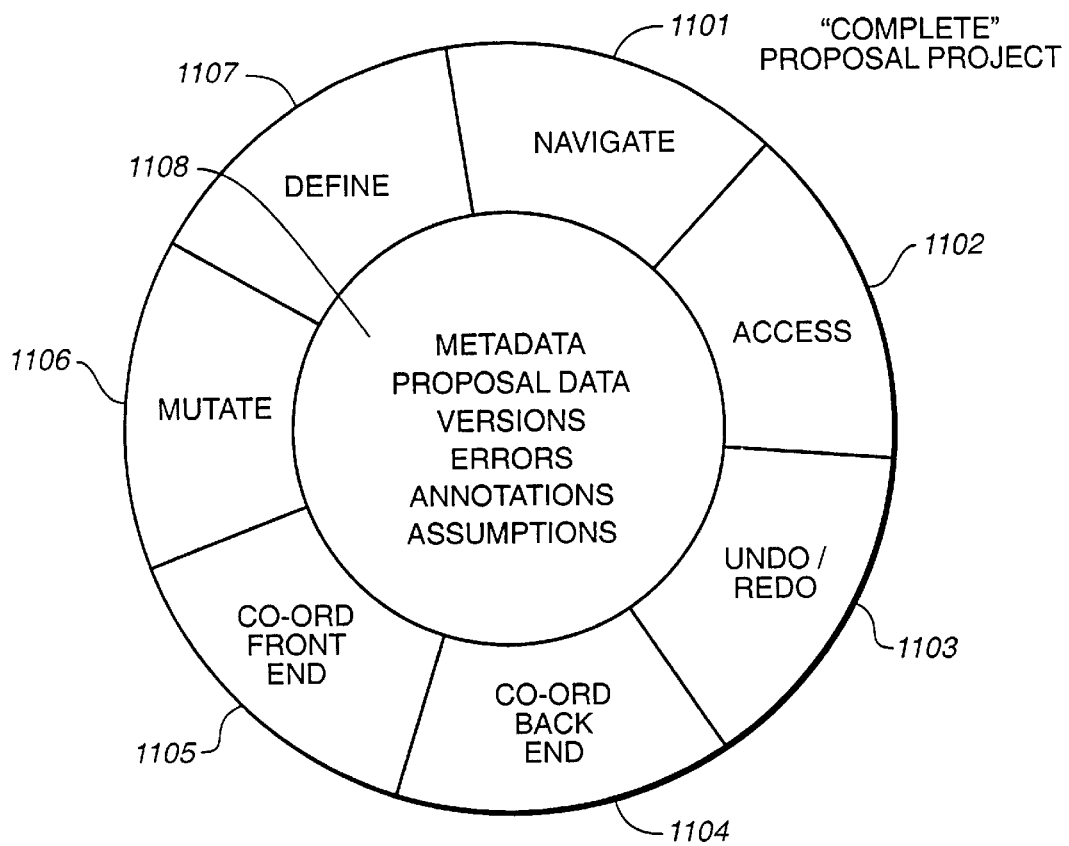
FIG._11
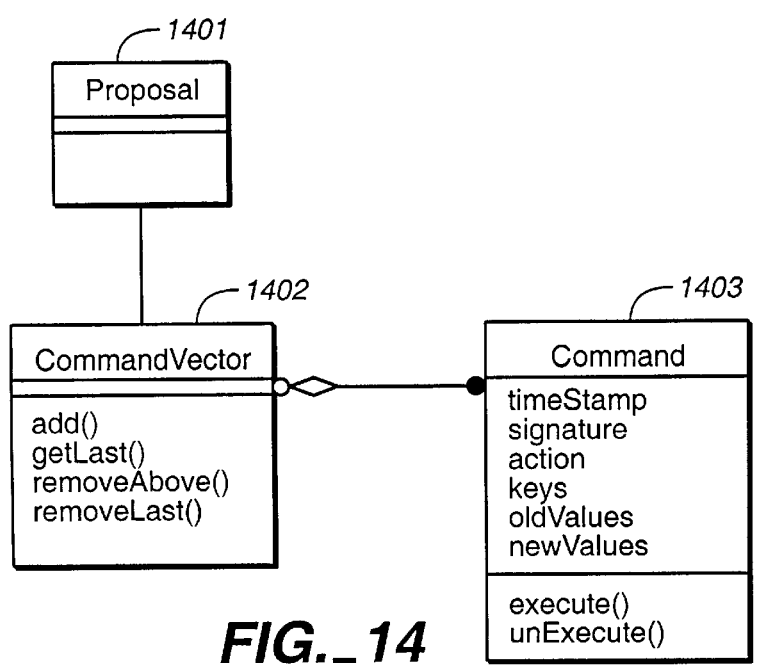
FIG._14

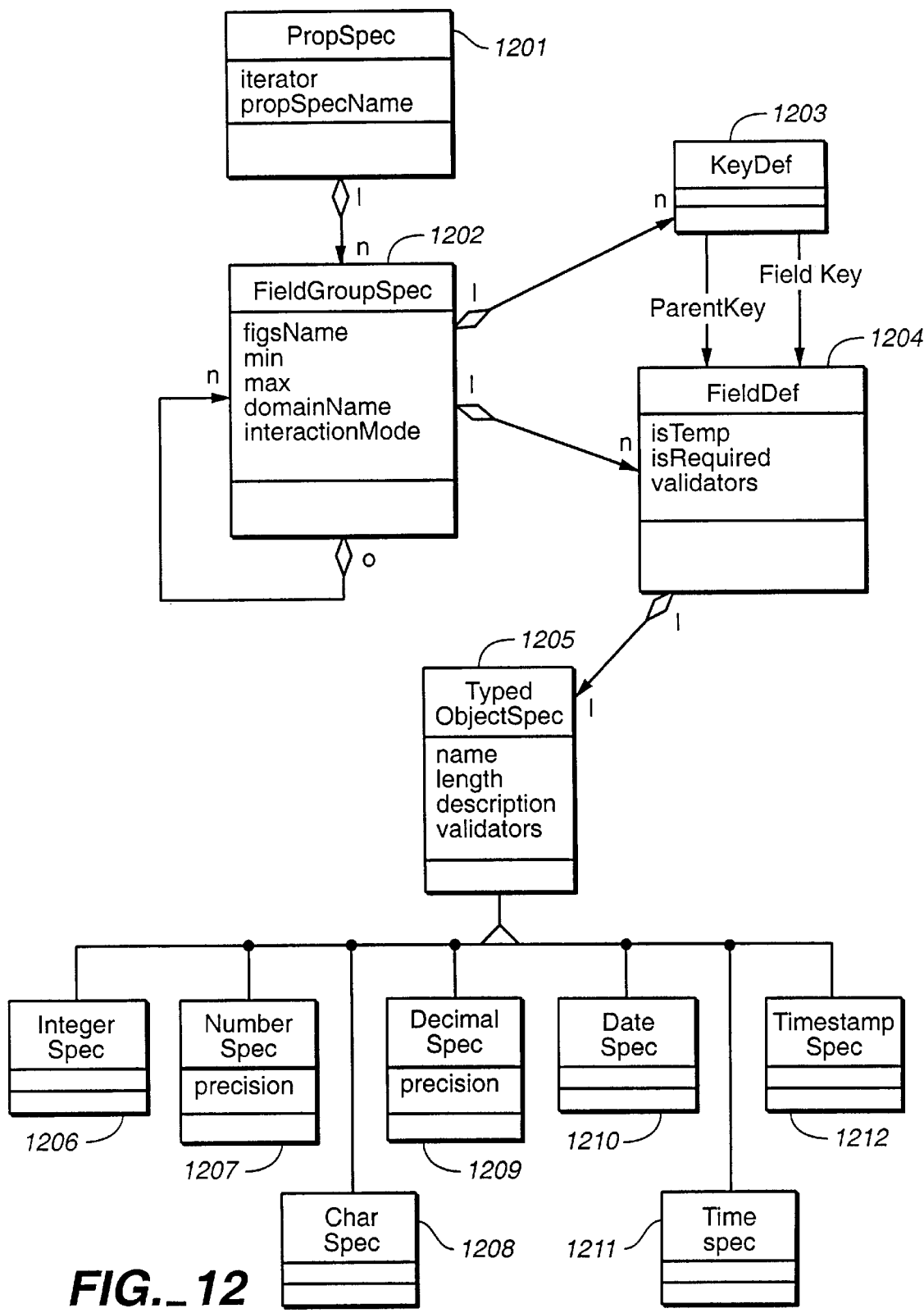
FIG._12

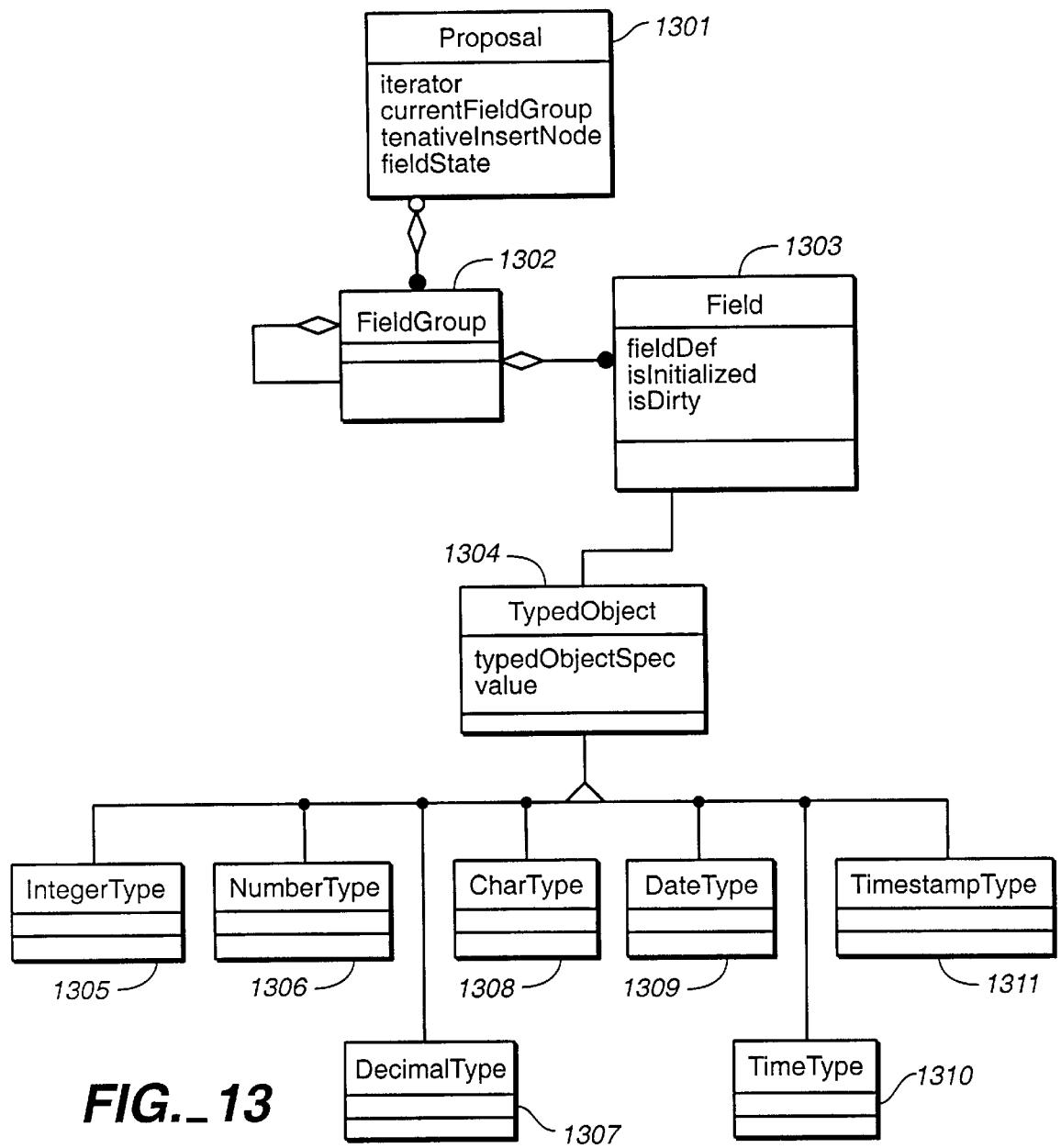
FIG._13

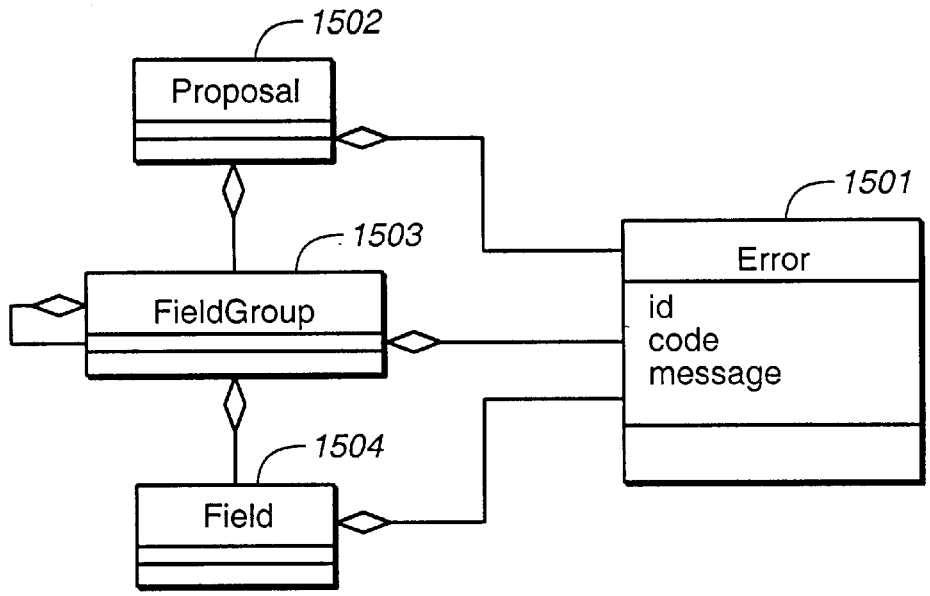
FIG._15
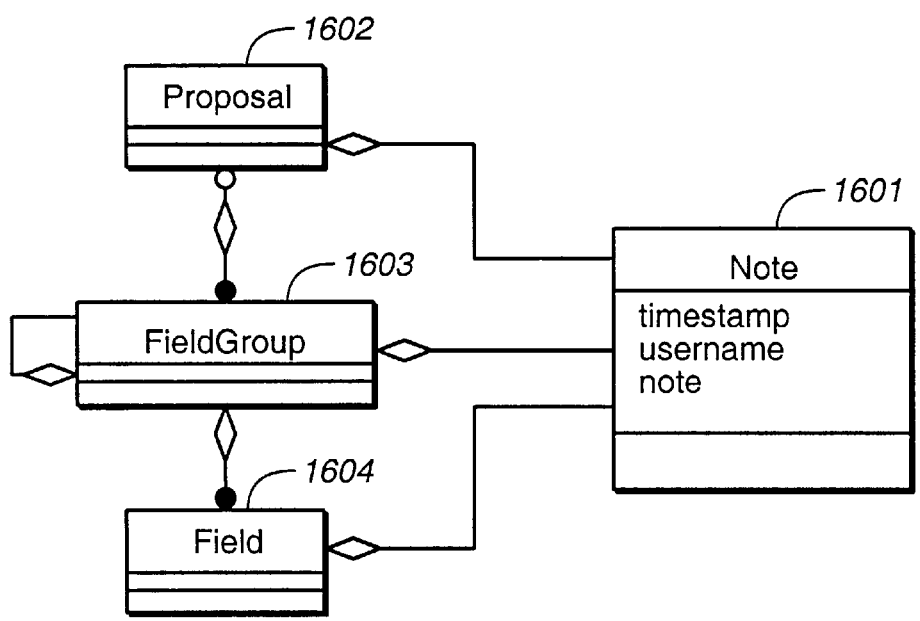
FIG._16

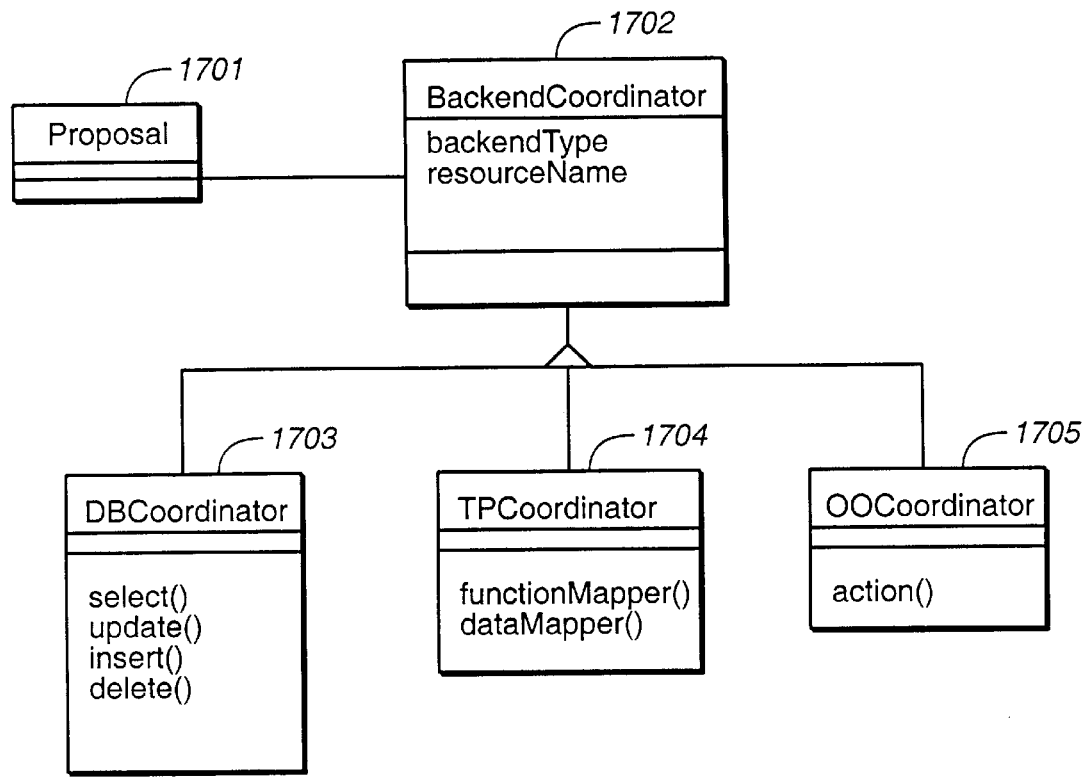
FIG._17
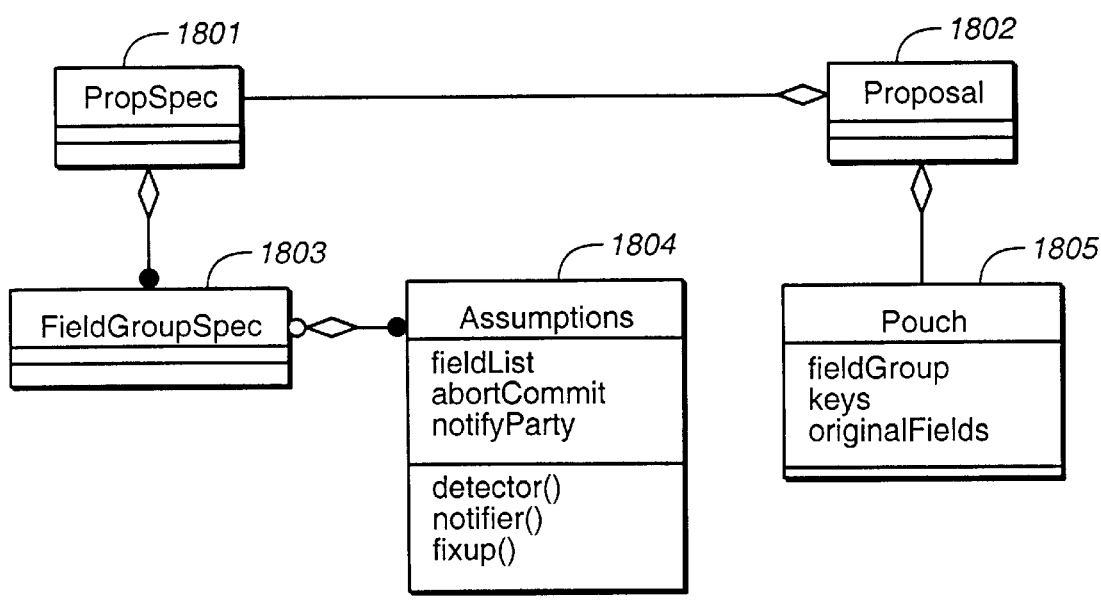
FIG._18

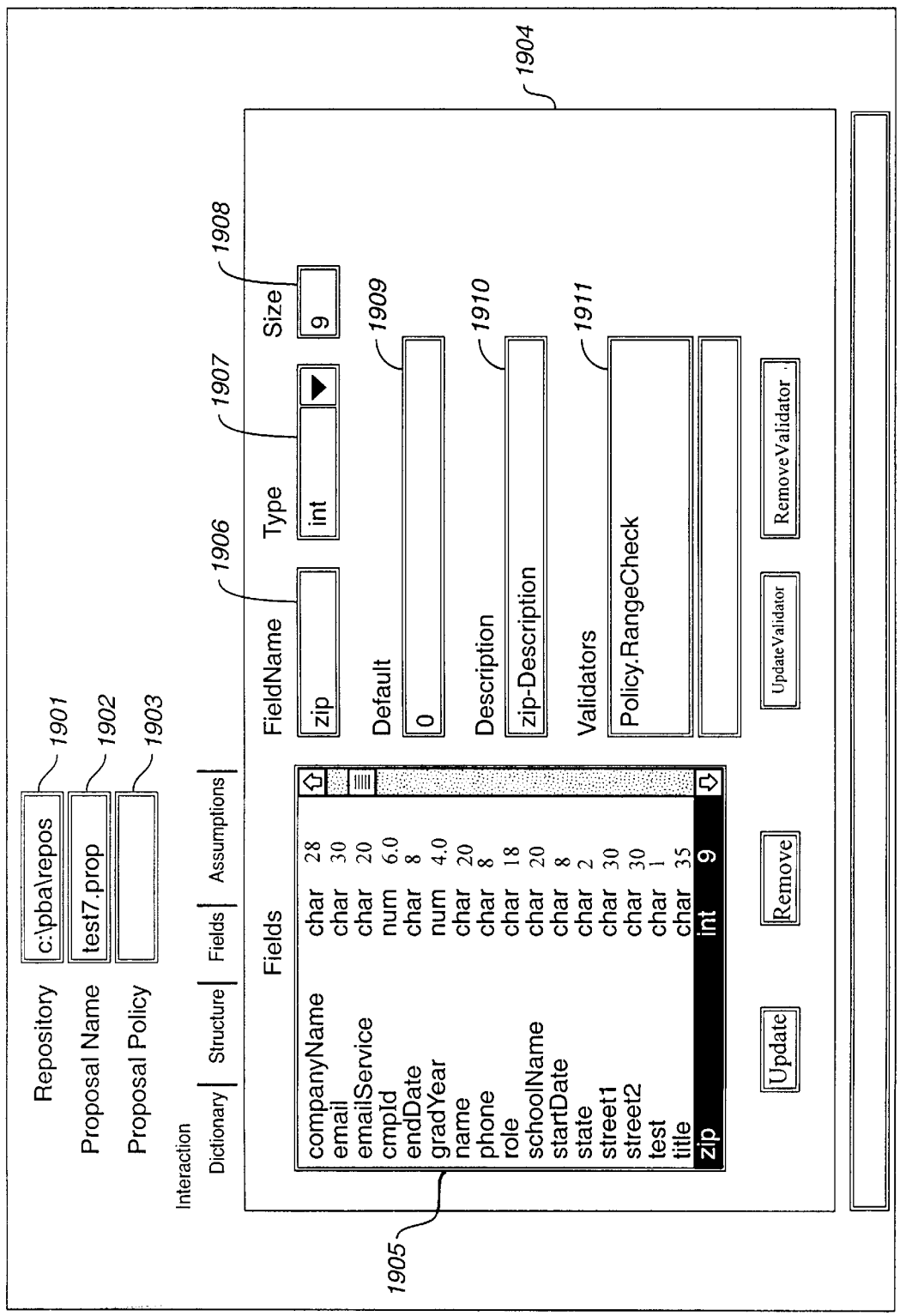
FIG._19

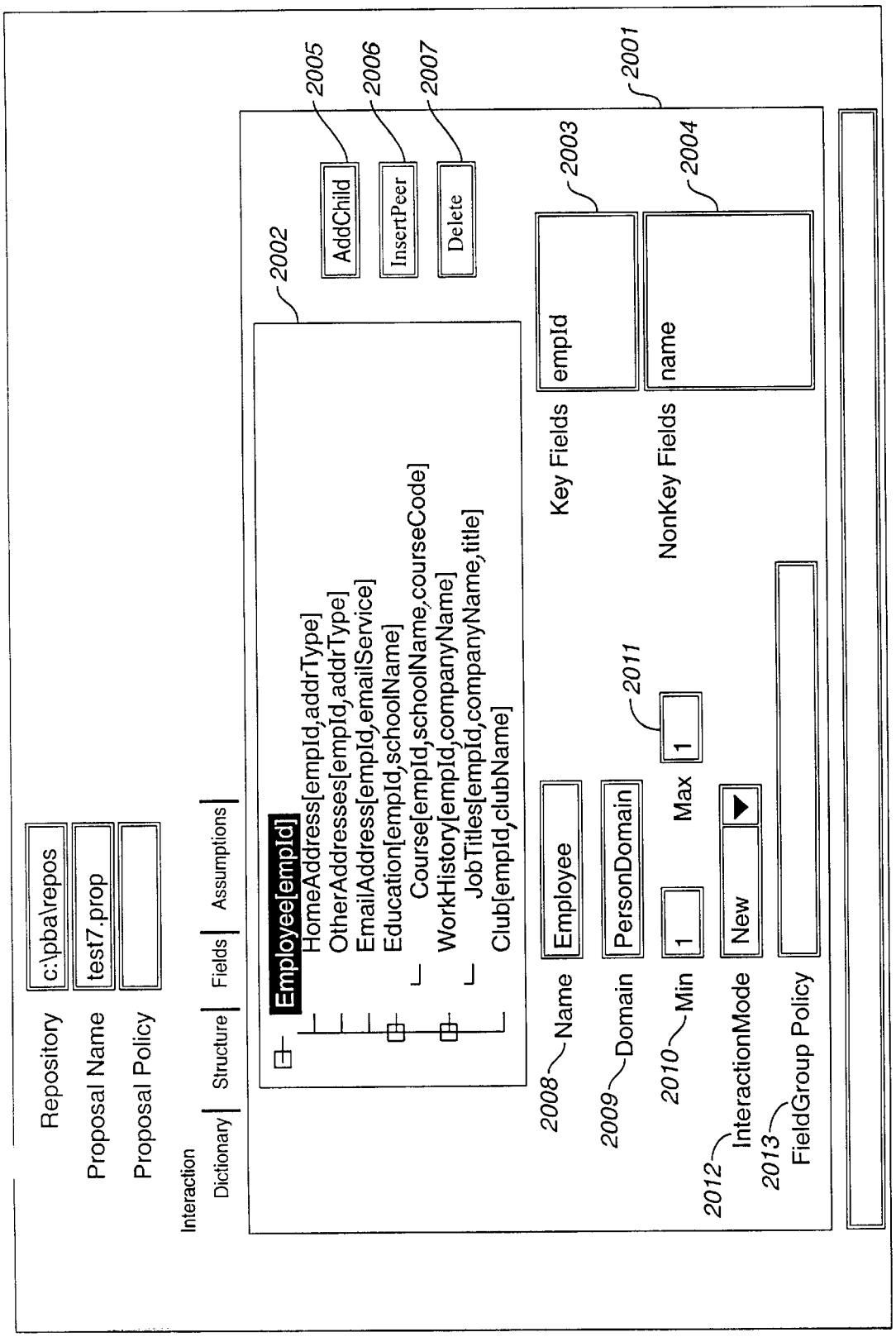
FIG._20

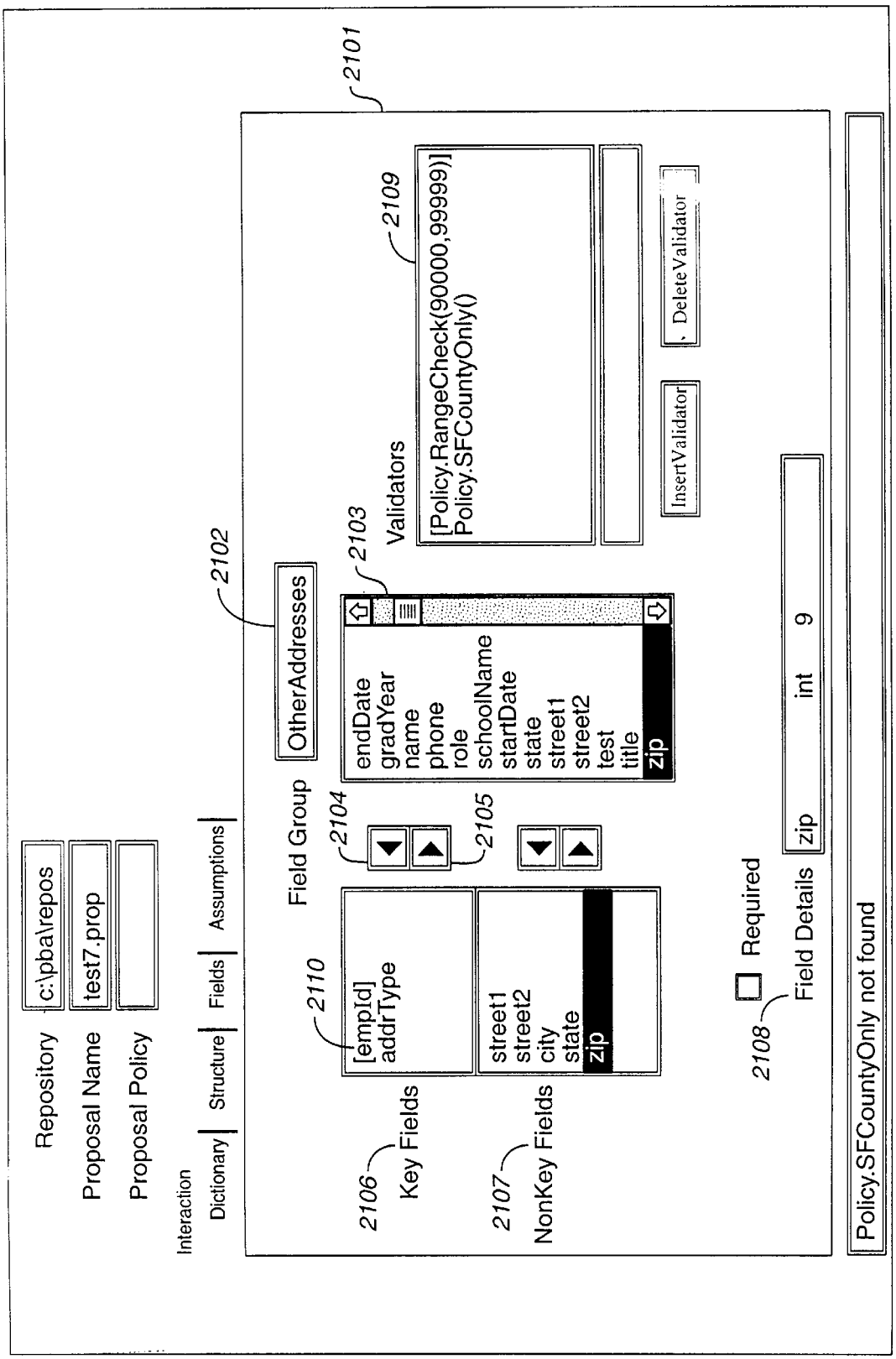
FIG._21

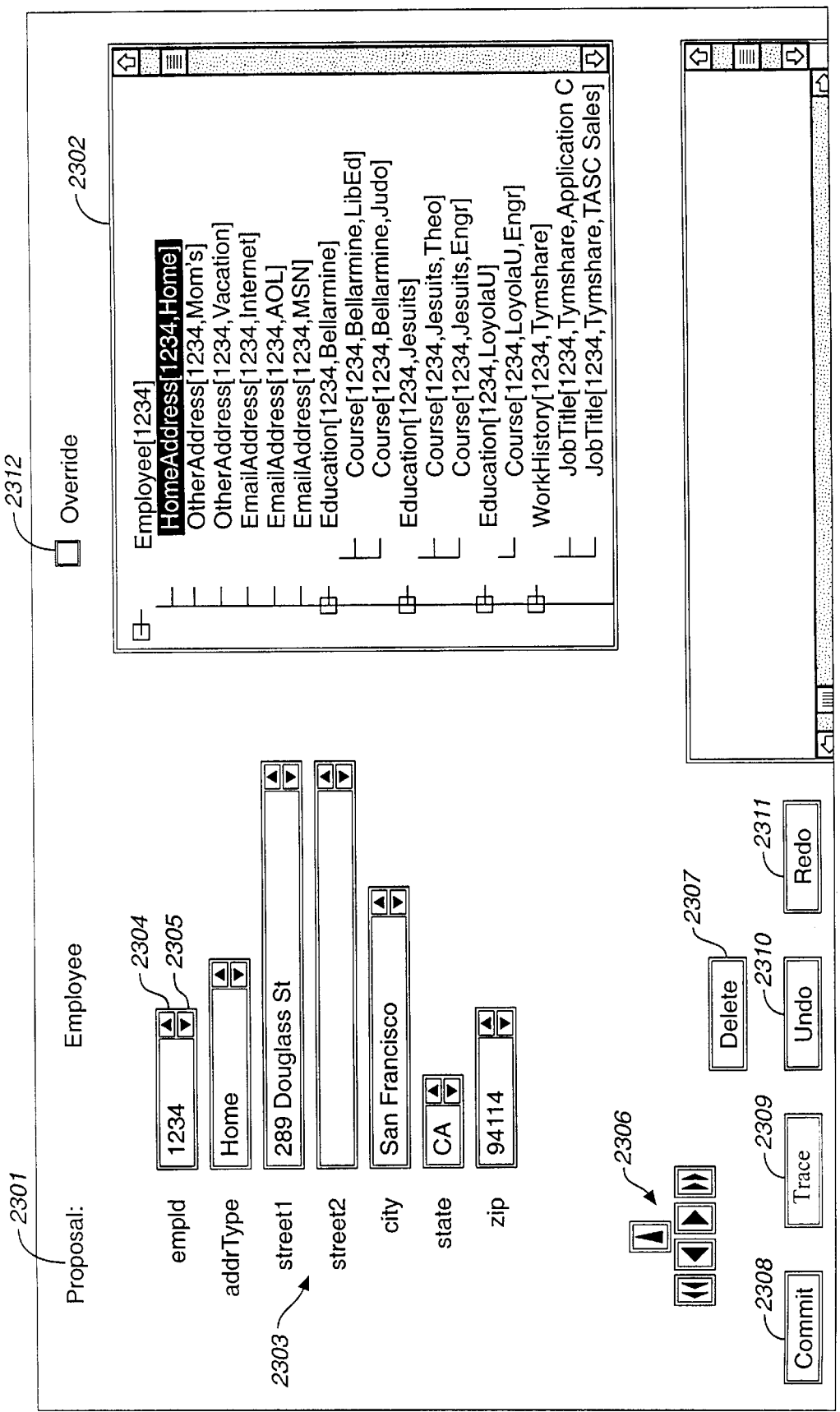
FIG._23

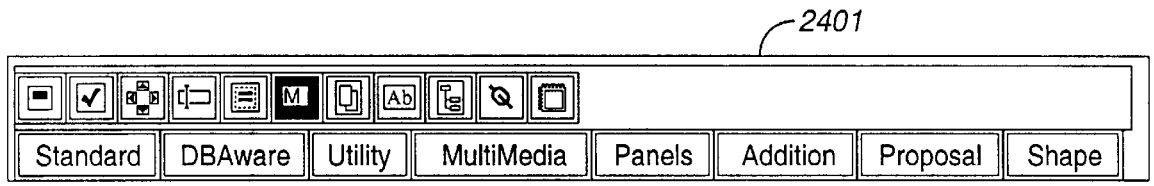
FIG._24
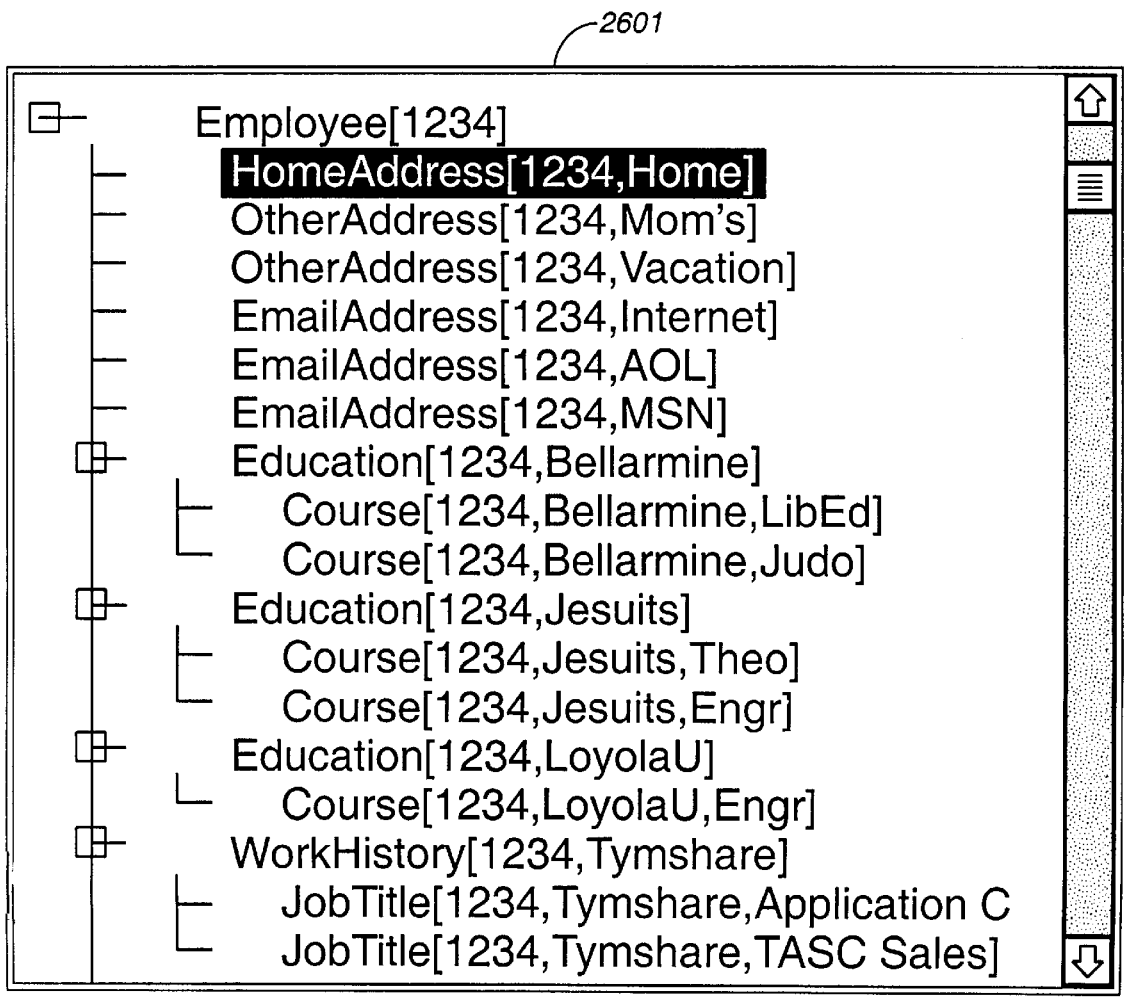
FIG._26

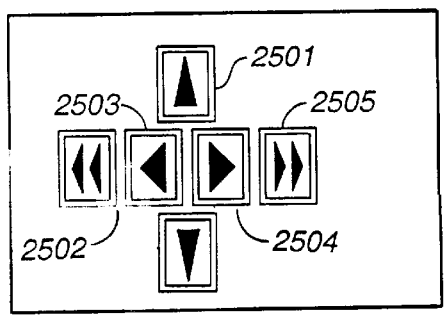
FIG._25
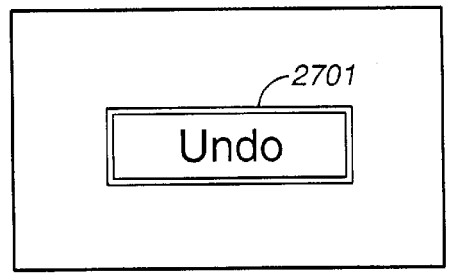
FIG._27
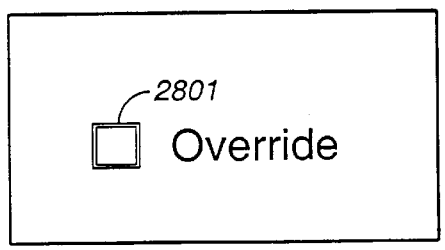
FIG._28
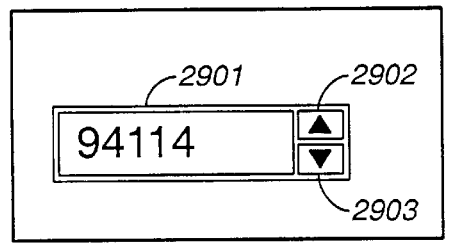
FIG._29
FIG._30

PROPOSAL BASED ARCHITECTURE SYSTEM

This application claims benefit of Provisional Application 60/047,245 filed May 21, 1997.

BACKGROUND OF THE INVENTION

1. Technical Field

The invention relates to the conversion of transaction submission processes into a generic object in a computer environment. More particularly, the invention relates to the conversion of transaction submission processes in an information processing application into a generic proposal object in a computer environment.

2. Description of the Prior Art

The information processing industry faces a mounting backlog in developing applications to handle transactions. Significant parts of the development process have been sped up through the use of tools, architecture, and reusable components. Referring to FIG. 1, few efficiencies have been gained in programming the large stretch of the application 102 that links user interface 101 with the database manager or transaction monitor 103 that controls changes to the stored database. This area of programming 102 is made from scratch, by hand, for each of the perhaps thousands of applications that an organization might need in a year.

With respect to FIG. 2, the basic problem is a semantic mismatch between the two ends of the system. User input enters the system front-end 201 as "atoms" of information, while the back-end resource 203 deals with large, complex data "molecules." The input that user interfaces 201 collect is fine-grained - - - typed characters, clicked buttons, scanned-in codes, etc. - - -, with little built-in sense of relationship among them. There is usually some organization of characters into fields and occasionally of fields into "pages," but user interface structure stops at this point.

It falls to the application programmer to individually map each small field or page to its proper place in the large and complex structure that will be presented to the transactional back-end 203. These mappings consist of programmatic hard-wiring 202. So even a simple transactional application has at its center 202 a maze of hand-built, application-specific connections that are time-consuming to construct and difficult to change. A labor-intensive redesign is required whenever new features are desired.

It would be advantageous to provide an architecture system that isolates the transaction submission process making it independent of both the front-end and back-end thereby creating an object that can be accessed via multiple user interfaces and detachable from the back-end, thus freeing up the back-end resources. It would further be advantageous to provide an architecture system that takes advantage of the generic properties of the object, thereby allowing it to be reusable for any new types of transactions that the user desires.

SUMMARY OF THE INVENTION

The invention provides a "Proposal"-based architecture system. The invention utilizes an easy-to-use toolset to create a generic object that duplicates a transaction submission process, thereby creating an object called a "Proposal" that is independent from the user interface front-end and the transaction processor back-end. In addition, the invention provides a system that is aware of its own hierarchical structure and is able to preserve data validity.

A preferred embodiment of the invention provides a tool set which allows the user to create a set of Proposal Specifications which define the structure of the possible components of a Proposal. The user defines the complete characteristics (metadata) for any kind of Proposal. Proposal Specifications define the hierarchy of domain relationships, interaction modes, validation references, and assumptions. The actual Proposal instance is formed using the definitions in the Proposal Specifications.

A Proposal allows a user to add, change, and annotate data. It is self aware and navigates between pages and skips to appropriate fields automatically and supports n-level undo/redo. Additionally, it tracks all versions of data updates and the user that is responsible for each data update and recognizes and corrects stale data. It also enables long-lived transactions, off-line transaction processing, and collaborative transactions.

A Proposal is accessed via one or more User Interfaces (UI). This breaks the close coupling between the front-end and the back-end, thereby allowing the user to add a Web interface or Graphical User Interface (GUI) or other kind of front-end without having to rewrite the back-end application. A UI coordinator maps user input fields to components of the Proposal. It communicates with different user interfaces such as: Internet; Graphical User Interface (GUI); Object Oriented User Interface (OOUI); proprietary interface; and devices such as bar code readers or keypads. The invention also provides a default UI and components.

A set of Transaction Processing/Data Processing (TP/DP) interfaces are provided to communicate with back-end transactional interfaces such as Database Management Systems (DBMS), Transactional Processing (TP) Monitors, and Object Oriented Databases.

Other aspects and advantages of the invention will become apparent from the following detailed description in combination with the accompanying drawings, illustrating, by way of example, the principles of the invention.

BRIEF DESCRIPTION OF THE DRAWINGS

FIG. 1 is a schematic diagram of a transaction process according to the invention;

FIG. 2 is a schematic diagram of the mapping of atoms to molecules in a transaction process according to the invention;

FIG. 3 is a schematic diagram of the invention sitting between a user interface and a back-end according to the invention;

FIG. 4 is a schematic diagram of a Proposal object mediating between a front-end and a back-end according to the invention;

FIG. 5 is a block schematic diagram of the components of a preferred embodiment of the invention according to the invention;

FIG. 6 is a block schematic diagram of the User Interface (UI) Coordinator as an interface between multiple UI's and a Proposal object according to the invention;

FIG. 7 is a block schematic diagram of the lifecycle of a Proposal object according to the invention;

FIG. 8 is a block schematic diagram of a generic Proposal according to the invention;

FIG. 9 is a block schematic diagram of multiple UI's communicating through a Proposal object to a back-end resource according to the invention;

FIG. 10 is a block schematic diagram of the different possible locations of a Proposal in various computer environments according to the invention;

FIG. 11 is a block schematic diagram of the structure of a Proposal according to the invention;

FIG. 12 is a block schematic diagram of a Proposal PropSpec metadata set according to the invention;

FIG. 13 is a block schematic diagram of a basic Proposal structure according to the invention;

FIG. 14 is a block schematic diagram of the Version classes according to the invention;

FIG. 15 is a block schematic diagram of the Error class according to the invention;

FIG. 16 is a block schematic diagram of the Annotations class according to the invention;

FIG. 17 is a block schematic diagram of the Resource Coordinators class according to the invention;

FIG. 18 is a block schematic diagram of the Assumptions class according to the invention;

FIG. 19 is a block schematic diagram of a screenshot of a Field Dictionary interface according to the invention;

FIG. 20 is a block schematic diagram of a screenshot of a Proposal Structure interface according to the invention;

FIG. 21 is a block schematic diagram of a FieldGroup page according to the invention;

FIG. 23 is a block schematic diagram of a screenshot of a Proposal Viewer interface according to the invention;

FIG. 24 is a block schematic diagram of a Proposal toolbar according to the invention;

FIG. 25 is a block schematic diagram of Proposal arrow buttons according to the invention;

FIG. 26 is a block schematic diagram of a Proposal tree view according to the invention;

FIG. 27 is a block schematic diagram of a Proposal action button according to the invention;

FIG. 28 is a block schematic diagram of a Proposal checkbox according to the invention;

FIG. 29 is a block schematic diagram of a Proposal field according to the invention; and FIG. 30 is a block schematic diagram of a Proposal field panel according to the invention.

DETAILED DESCRIPTION OF THE INVENTION

Figure 22:
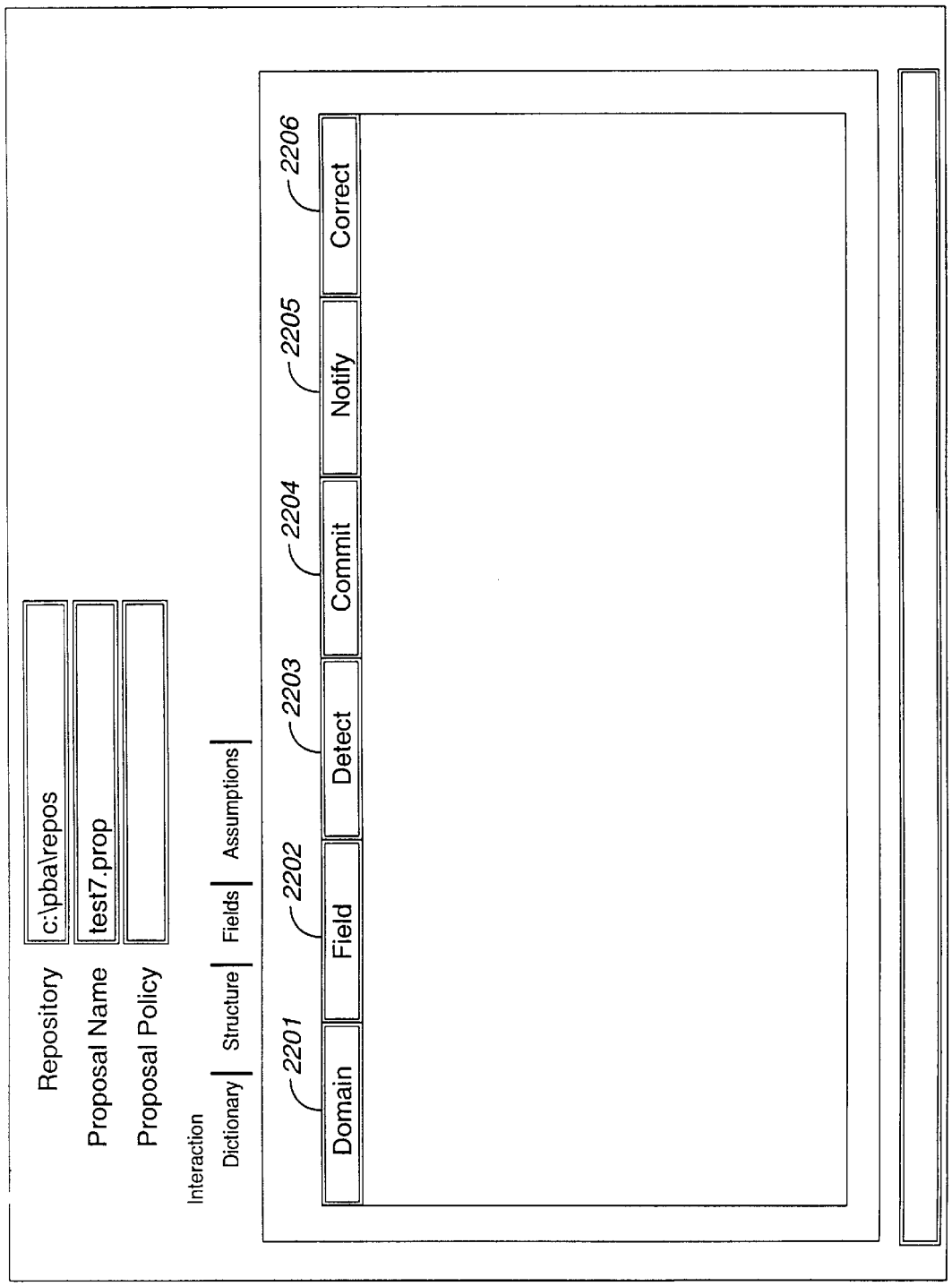
FIG. 22 is a block schematic diagram of a screenshot of an Assumptions page according to the invention.

The invention is embodied in a Proposal based architecture system for expediting the transaction submission processes in a computer environment. A system according to the invention provides an easy to use toolset to create a generic object Proposal that duplicates a transaction submission process, thereby creating an object that is independent from the user interface front-end and the transaction processor back-end. In addition, the invention provides a system that is aware of its own hierarchical structure and is able to preserve data validity. Many existing approaches require extensive labor intensive redesigns whenever front-end or back-end requirements change.

The invention builds upon the premise that there exists a generic pattern for the middle area between the user interface (the front-end) and the transactional back-end (i.e., Database Management Systems (DBMS), Transaction Processing (TP) Monitors, and Object Oriented Databases) in a transactional application. The generic pattern is applicable to any kind of transactional application and will take over 80 or 90% of the front-to-back-end coordination work.

A preferred embodiment of the invention abstracts and automates generic application co-ordination behaviors. Essentially, the invention takes over the data and function mapping process. It provides an intelligent hierarchic framework that lets the programmer assign each field or group of fields to a certain level in the hierarchy. The transactional request gets structured automatically, and every bit of user input is assigned to its proper place in the transactional whole.

Referring to FIGS. 3–4, this framework is embodied in the object 302, which sits between the front 301 and the back ends 303 and mediates between them. The framework is not hard-wired to either end. It is a separate entity that shuttles between them, sometimes communicating with one end, sometimes the other, sometimes detached from both.

This object represents a packaging-up of the entire process that goes into preparing a transaction for submission. It includes not just the data mapping behavior, but other useful transaction-formation behaviors such as document navigation, error and annotation-handling, and versioning. As a reusable object, it implements features that would be too expensive to program in to a single application.

The object that encapsulates these behaviors is called a Proposal. Like a proposal in the human world—to buy a house, get married, do a certain job for a certain fee—it occupies the space between mulling something over and signing an iron-clad contract. A proposal is how a deal gets shaped. It moves between the parties as a vehicle for discussion. It is tentative, negotiable, and probably not perfect at first. It may go through multiple versions. A proposal makes sure that the parties understand each other and that the terms of the final deal mean the same thing to each. And a proposal eventually reaches a point where it either turns into a contract or is abandoned.

With respect to FIG. 4, a Proposal object 402 serves a similar function in the preparation of the transactional "contract." It mediates between the front 401 and the back end 403, replacing the hard-wiring that used to join them.

Referring to FIG. 5, the invention provides a tool set called the Proposal Spec Builder 501 which allows the user to create a set of Proposal Specifications 502 which define the structure of the possible components of a Proposal 503. The user defines the complete characteristics (metadata) for any kind of Proposal. The actual Proposal instance 503 is formed using the definitions in the Proposal Spec 502.

A Proposal 503 is accessed via multiple User Interfaces (UI). This breaks the close coupling between the front-end and the back-end, thereby allowing the user to add a Web or Graphical User Interface (GUI) front-end without having to rewrite the back-end application. The invention provides a default UI and components 504. The User can define his own UI 505 in place of the default UI 504. Either UI communicates through a UI coordinator 506 to tie the UI elements with the appropriate elements defined in the Proposal.

A set of Transaction Processing/Data Processing (TP/DP) interfaces 507 are created to communicate with back-end transactional interfaces such as Database Management Systems (DBMS) 508, Transactional Processing (TP) Monitors 509, and Object Oriented Databases 510.

With respect to FIG. 6, the UI Coordinator 603 coordinates actions between the Proposal 604 and any UI consumer. The interface between the UI Coordinator 603 and User-defined UI 601 or default UI components 602 makes the coordination independent of how the UI is implemented.

A Proposal object is self-aware, which means that it contains detailed knowledge of its own form and contents. For example, it:

Knows the type of its contents.

Knows how contents are arranged (hierarchy).

Knows validation criteria for its contents.

Keeps track of errors accruing on data.

Holds annotations to data.

Tracks significant versions and who is responsible for each version.

Knows how particular pieces of data will have to interact with the back-end to simulate the transactional conversation that it is replacing.

Remembers assumptions on which it is based, so they can be checked for continued validity.

Referring to FIG. 7, the lifecycle of a Proposal is shown. A developer 701 defines the Proposal Specification 702 using the Proposal Specification Builder 703. All Proposal Specifications 704 that are defined are placed in a repository 705 which holds all of the possible specifications for a Proposal.

A user 706 selects the appropriate Proposal Specification for the desired type of Proposal from the repository 705. The Proposal is created through the Proposal Factory 707 and a Proposal 708 is made available to all users 706, 709. The users can add, change, and annotate data to the Proposal 708. Proposal updates are submitted to the DBMS or TP monitor 710. If any errors occur in the updates, error messages are added to the Proposal 708.

In effect, the invention turns a real-time activity into a durable thing. This brings architecture to a large area of the system that has until now been a sinkhole of programmer time and development dollars.

A number of benefits follow.

With respect to FIG. 8, development is greatly simplified. Proposal-based architecture handles complex front-end problems with a reusable, generic infrastructure 801. This infrastructure 801 contributes many features (undo/redo, annotation, etc.) that would otherwise have to be programmed manually.

There is now a roadmap for the region between consumer and database. A programming task that is currently ad-hoc, idiosyncratic, and unpredictable becomes rationalized. The invention's architecture contributes not only a set of behaviors, but also standard procedures and approaches. Even that code which is application-specific has clearly-defined sockets; the development job becomes less improvisational and more like filling in the blanks. The invention makes possible reliable project plans, staffing requirements and time/expense estimations.

Navigation comes built in. A Proposal, self-aware like all objects and even more introspective than most, knows a great deal about its own structure. It knows the type of its contents, how the contents are arranged, and the validation criteria for its contents. It "turns pages" and skips to appropriate fields automatically. The complex programming currently required for multi-page, hierarchic documents is avoided, because navigational intelligence is part of the proposal object's infrastructure.

Applications developed using Proposals are easy to change. With the front and the back no longer closely-coupled, a change to one end does not involve corresponding changes to the other. Alterations are localized. Proposal behavior can be changed with a change to the metadata. Adding a new user interface-enabling a Web browser, for instance, or hooking up to a bar-code reader-involves work at that interface and nothing more. Back-end changes are made at the TP/DB interface. Implementing these changes may still require extensive programming, but the programming is isolated.

Referring to FIG. 9, a Proposal 902 decouples the user interface 901 from the transaction processor 903. The Proposal 902, not the user, addresses the back end 903. On the other end, the Proposal 902 accepts input from virtually any user interface 901 (since the essence of a Proposal is non-visual, viewers are "dumb" and easily created). Thus, a single back end 903 can support several different user interfaces 901—Internet, GUI, Object-Oriented (OO) UI, proprietary interface, a device like a bar code reader or keypad—simultaneously or serially. A Proposal could be initiated on a scanner, sent over the Net to a human using a Mac, reviewed on a Web browser by his supervisor, and launched toward the TP monitor from a PC.

Inherently independent of the server, Proposals work equally well for on-line, real-time interactions and for off-line data gathering. They are ideal for mobile computing.

The invention enables new-wave Internet security, including authorization, authentication and digital signatures. Individual versions can be set up to support reliable signatures indicating who requested what changes. A Proposal object can display both its current, cumulative state and also a linked list of changes, signatures, and dates and traces what happened at every point.

Proposals concretize the transactional conversation. A transactional conversation-ephemeral, like all conversations—vanishes once completed or aborted, leaving no record of the process. A Proposal, on the other hand, contains a detailed history of its own evolution: preliminary attempts, annotations, approvals and overrides. Since it layers every step in its development like overlapping transparencies, a Proposal can be rolled back to any earlier point. Full n-level undo/redo is automatic. Proposal objects can also be archived, creating a full "paper trail" for later audit.

Proposals model the way humans work, and are therefore more pleasant and more efficient to use. The transaction monitor (or equivalent function within the database) demands certain input in a certain order, and the user must scramble to oblige. With a Proposal as intermediary, the process becomes more flexible and forgiving. A Proposal can be pended and worked on over time. It can be moved around among users, so that collaborative computing becomes easy. It will accept tentative, incomplete, even erroneous input and flag it for further work later. A Proposal can carry annotations, notes to oneself or to a colleague.

Proposal-based architecture adds value throughout the process of preparing a unit-of-work. Current technology kicks in only at the very end of what can be a long, collaborative, start-and-stop process that has to be assembled on paper and routed through the organization by people walking around from desk to desk. Proposals get the computer involved from the beginning. They can tolerate tentative, half-done, interrupted, even erroneous data, and help shape it into a formal transaction. For example, a new-hire procedure could start the day the applicant comes in for the initial interview, follow her throughout the interview/background check/skills-test process, and finally, if all goes well, turn into a formal "AddEmployee" request to the HR database.

Proposal-based architecture lets transactional applications take advantage of Workflow. The two technologies are strongly complementary: workflow provides the transport system, Proposals package up the contents of what is transported. A one-user/one-mainframe conversation cannot be transported around an organization, but an object can. Proposals turn transactional conversations into routable entities that a Workflow system can handle. None of the above capabilities is unheard of in transactional applications. But where they exist, they have been achieved with great effort, and on a one-time-only basis. The significance of the invention is that these capabilities are innate. They are built into the infrastructure, available to any application that wants to make use of them. In a sense, they come free.

The invention's approach to conceptualizing, objectizing, and architecting the vast application logic piece of transactional systems offers many advantages:

Developers find a ready-made framework that contributed large chunks of useful infrastructure, dramatically reducing the time and effort of building transactional applications. They also get a formalized methodology for organizing that kind of development job.

Users find an accommodating face on formerly unforgiving applications. If a TP monitor is like an impatient and demanding boss who will kick you out of his office if you haven't got all your ducks in a row, a Proposal is like a sympathetic admin sitting out in the anteroom, helping you organize your presentation, gathering your supporting documents, and checking in with the boss of your behalf.

Organizations find their aging applications catapulted into the 90s. Adding Web front-ends, using Workflow, implementing mobile computing and collaborative computing become trivial jobs instead of major undertakings. The invention restructures applications so they are ready to take advantage of new developments as they come along.

Adding Proposal-Space to Computer Applications

Where Does a Proposal Live?

With respect to FIG. 10, a Proposal lives between the consumer and the resource. This does not tie it to any specific platform, tier, or machine. In a client/server interaction, the Proposal would reside either on the client (in a fat client architecture) 1001 or the server (in a thin client architecture) 1002. In a three-tier system, it would probably occupy the middle tier 1005 between user 1004 and the data on the server 1006. In a monolithic system 1003, it would sit between user and data on the mainframe. It is a great advantage of a Proposal that it moves freely among platforms. It can change its location on an interaction-to-interaction basis.

What Does a Proposal Have to Do?

To accomplish its job, a Proposal must assume a number of responsibilities for its own metadata, the application-specific data entrusted to it, and many navigational and organizational chores. Each of these responsibilities is implemented via both behaviors built into the generic Proposal object, and the state specific to that particular instance.

1. Know Its Own Definition

Referring to FIG. 11, a Proposal has a great deal of self-awareness. It is what is called a "highly introspective"
object. It knows the type of its contents. It knows how those contents are arranged hierarchically, and it knows the cardinality of that hierarchy. The Proposal is aware of whatever customized validation strategies have been specified. It knows enough about itself to perform reasonable data mutation on a metadata change.

State: Metadata 1108

Methods: Define 1107, Mutate 1106

2. Act as a Container for Proposal Data

All data related to a specific Proposal is encapsulated in that instance of the Proposal object. This data can be saved in any partially-completed form. Hierarchic navigation through the data, a sort of "page-turning" through a complex document, comes built in. User interactions with the data are standardized.

State: Proposal Data 1108

Methods: Navigate 1101, Access 1102

3. Keep Versions of Itself

Each modification to a field in a FieldGroup is interpreted as a new "version." All versions are retained for the life of the Proposal, or until explicitly disposed of. This versioning permits unlimited undo/redo, even across session boundaries. A Proposal can be customized to associate a digital signature with each version, creating a record of who made what change when.

State: Versions 1108

Methods: Undo/Redo 1103

4. Retain and Track Errors

Proposals will accept, hold and tag erroneous or incomplete data. Any number of errors can be associated with any Proposal element—page, etc., down to field level. Errors can be externally manipulated; set by a "review agent," for instance. Errors and error notices persist across sessions and across locales; they travel with the Proposal. The Proposal infrastructure includes an error-search mechanism that makes sure all errors are resolved prior to submission.

State: Errors 1108

5. Hold Annotations

As with Errors (which are really a specialized form of Annotation), a Proposal can associate any number of Annotations with any Proposal element. Annotations are versioned, and thus undo/redo-able. They can be externally manipulated and scanned for summary review.

State: Annotations 1108

6. Interact With a Variety of Consumers

A Proposal is a non-visual object that can support a wide variety of consumers. It implements standard viewers into the Proposal object. It co-ordinates events and messages for both the consumer and the Proposal. With this setup, even non-human automatons can be "consumer."

Method: Co-ordinate Front End 1105

7. Interact With Server

At its other end, the Proposal interacts with the server that holds the datastore. The interface between the Proposal and the back end is dictated by the parameterized interaction mode.

The interface to a database system (via JDBC, for example) can automate "data-mapped back ends.

The interface to a transaction processor defines the protocol for "function-mapped" back ends.

The interface to an OO database can automate "object-mapped" back ends.

Method: Co-ordinate Back End 1104

8. Protect Against Stale Data

Since the Proposal "withdraws" data from the database and works with it over what may be a long period of time, it needs to make sure that the data has not become stale in the interim. The invention accomplishes this with built-in optimistic locking. Behavior called "assumptions" defines optimistic parameters. Interference can be keyed off of a timestamp or off of arbitrary fields. The developer can specify, on a field-by-field basis, what the disposition should be when a mismatch is found: commit/rollback, notify/hush, a custom fixup, or any combination—commit with notification, for example. Custom fixup strategies—LastUpdaterWins, for example—can be specified in Java. The invention implements a strategy called "proximate intentionality" to assure reasonable behavior.

State: Assumptions 1108

Proposal-Based Architecture: Implementation

The invention consists of the following components:

Proposal Framework. This is the underlying library of software (implemented as OO classes) that supplies the algorithms and data structures required for implementing Proposals and their metadata, both at development time and at runtime.

Proposal Tools. These are the applications that let the Proposal adapter configure specific Proposal templates to be used for specific business applications.

Proposal-Aware Components. These are software gadgets with built-in awareness of Proposal data structures that can be assembled to quickly assemble applications that will work with Proposals.

Proposal Framework

Technical Notes

The invention's implementation has been designed and implemented using object-oriented practices and terminology. A good overview is *Object-Oriented Analysis and Design* by Grady Booch.

Diagrams in this document follow the widely-used Object Modeling Technique (OMT) notation. These diagrams were produced by Rational Rose 3.0.

Since proposals need to collaborate intimately with transactions, much language and concept related to transaction processing is included. We use the definitions provided in the book *Transaction Processing: Concepts and Techniques* by Jim Gray.

In the succeeding pages, accessor methods are assumed for the state that is represented in the object diagrams.

There is frequent reference in this document to design or implementation "patterns." Patterns are a relatively new way of describing portions of a software design in a standard and succinct format.

The defining book of the Patterns movement is *Design Patterns: Elements of Reusable Object-Oriented Software* by Gamma, Helm, Johnson and Vlissades (Addison-Wesley, 1995). This text is so universally used it has been nicknamed GoF (Gang-of-Four). All patterns mentioned here are GoF patterns. The following is a brief definition of those patterns we especially rely in the invention's implementation, with the GoF definition quoted and then put into the invention's context.

Composite

"Compose objects into tree structures to represent part-whole hierarchies. Composite lets clients treat individual objects and compositions of objects uniformly".

Composite is used in numerous parts of the invention to implement tree structures. Its principle uses are the Proposal object and the PropSpec object—both of which subclass the same Composite behavior.

Facade

"Provide a unified interface to a set of interfaces in a subsystem. Facade defines a flexible alternative to subclassing for extending functionality". The Proposal is a Facade. It hides dozens of classes behind a single interface that gives the illusion of a single class interface.

Command

"Encapsulate a request as an object, thereby letting you parameterize clients with different requests, queue or log requests, and support undoable operations"

The Proposal object itself is a specialized type of Command. It stands for the consumer's request to perform a transaction. Commands are also used to implement the Undo/Redo behavior of versions.

Iterator

"Provide a way to access the elements of an aggregate object sequentially without exposing its underlying representation".

Both Proposal and PropSpec Composites have their own Iterators for "walking" the tree of data or metadata.

Observer

"Define a one-to-many dependency between objects so that when one object changes state, all its dependents are notified and updated automatically."

The Proposal object has an Observer for watching for its state changes. The UICoordinator and BackendCoordinator are clients of this Observer and benefit from the Observer's vigilance.

Strategy

"Define a family of algorithms, encapsulate each one, and make them inter-changeable. Strategy lets the algorithm vary independently from clients that use it."

Both the TypedObject structure (shown in the PropSpec class diagram) and the Backend ResourceCoordinators are Strategy patterns. They allow alternative behaviors to be supported as options to the execution context.

Visitor

"Represent an operation to be performed on the elements of an object structure. Visitor lets you define a new operation without changing the classes of the elements on which it operates."

Visitors are used throughout the architecture. These are analogous to "user exits" from mainframe days. A user can supply supplementary behavior and install it into the invention to customize it. For example, the TypedObject supports a Visitor called a Validator. An adaptor can write a custom component to check the validity of a particular PartNumber format. He then installs it as a Visitor to customize the PartNumber. Visitors are also used in Assumptions and ResourceCoordinators.

Responsibilities into Objects

The invention uses "responsibility-based design," which describes an object's responsibilities and then implements each in terms of state (data structure) and behavior (algorithms). The Proposal responsibilities are:

1. Knowing its own definition
2. Acting as a container for proposal data
3. Keeping versions of itself
4. Retaining and tracking errors
5. Holding annotations 6. Interacting with consumers
7. Interacting with the back-end server
8. Protecting against stale data We discuss each in detail below. Class diagrams show what object classes are needed and how they relate to other classes. These diagrams are followed by a spreadsheet that contains a more detailed legend of the vocabulary used in the diagram. In some cases, specialized algorithms needed by the classes are discussed and/or diagrammed.

Implementing this state and behavior with a programming language produces a software machine that actually executes any kind of Proposal.

1. Knowing Its Own Definition

Most simple software programs don't need to "know" much about themselves. They simply do what they do; for example, an AccountsReceivableAging report knows how to look through its database of accounts and print out a list of who is late in paying.

However, more sophisticated programs need to adapt themselves for use in multiple situations. A Database Management System (DBMS) is an example. When the software is first purchased, it knows a great deal about data storage and manipulation but knows nothing about any particular application. The database programmer "trains" it to understand a specific database structure by providing it with "metadata," data that describes the data. The DBMS "learns" about a particular application area by absorbing and adding to its repertoire detailed definitions of the use to which it is being applied. This ability of programs to customize themselves to particular situations by absorbing user-supplied metadata is called "introspection" by object practitioners.

The Proposal implementation is introspective. In itself it is a generic component that knows nothing about any particular application. It is adapted by a software developer for a particular use—customized into a NewHire Proposal, for example.

The developer does this by supplying metadata to the Proposal object. The metadata describes the particular business usage that the Proposal object is being called upon to simulate. For example, a developer may be building a NewHire proposal that will be used to perform the business function of hiring an individual into a company. The developer provides metadata describing the various data fields of a NewHire (name, address, education history, job history, etc.) and how they relate to one another.

The newly-trained Proposal object is now available to the end user, perhaps a manager or a person in the personnel office. By this time, the NewHire Proposal knows the organization's hiring procedures along with the generic Proposal behaviors (how to annotate, change, navigate, etc.) that derive from its internal expertise as a Proposal object. The end-user will use an instance of the NewHire Proposal every time a candidate is to be hired: there will be the HireJohnSmith Proposal, the HireSallyJones Proposal, etc.

The first responsibility of a Proposal, then, is to hold the adapter-supplied metadata that turns it into a NewHire Proposal, a ShipProduct Proposal, or whatever. The invention accomplishes this through a structure called a PropSpec, or Proposal Specification. The PropSpec is the container for Proposal metadata. With respect to FIG. 12, a class diagram shows the major classes in the PropSpec

| Class | Name | Description |
| --- | --- | --- |
| PropSpec 1201 | | Facade for all PropSpec operations |
| State | iterator | Current position in subsidiary FieldGroupSpec composite |
| | propSpecName | Name of the PropSpec |
| Behavior | appendFgs | Append new FieldGroupSpec as child at iterator |
| | getRootFgs | Get root FieldGroupSpec |
| | insertFgs | Insert new FieldGroupSpec as peer at iterator |
| | insertableFrom | Determine valid FieldGroupSpecs that can be inserted here |
| | remove | Remove current FieldGroupSpec and its descendents |
| FieldGroup Spec 1202 | | Container of metadata for each FieldGroup |
| State | fgsName | Name of this FieldGroupSpec |
| | min | Minimum number of occurrences for this FieldGroupSpec |
| | max | Maximum number of occurrences for this FieldGroupSpec |
| | domainName | Backend resource for this FieldGroupSpec |
| | interactionMode | Control pattern for conversation between Proposal and Server |
| Behavior | accessors | Access methods for FieldGroupSpec state |
| | appendFieldDef | Append new FieldDef to FieldGroupSpec |
| | getFieldDefs | Get the FieldDefs for this FieldGroupSpec |
| | getNumberOfKeys | Compute the number of keys |
| | getNumberOfFields | Compute the number of fields |
| | insertFieldDef | Insert a FieldDef at a point in the FieldGroupSpec |
| | isInputCandidate | Is the specified field updateable or is it owned by an ancestor |
| | removeFieldDef | Remove a FieldDef from the FieldGroupSpec |
| KeyDef 1203 | | Information about a field that is used as key |
| State | fieldDef | FieldDef that defines this particular key |
| | parentKeyDef | Nonnull if this key is owned (defined) by a parent FieldGroupSpec |
| Behavior | getKeyDef | Get fieldDef that defines this particular key |
| | isParentMapped | Does parent FieldGroupSpec own this FieldSpec |

-continued

| Class | Name | Description |
|---|---|---|
| FieldDef 1204 | | Information about a field definition entry |
| State | isTemp | Is this a temporary field (no backend interaction)? |
| | isRequired | Is this field required to be defined |
| | validators | List of Visitor classes that act as validation behaviors |
| | typedObjectSpec | Detailed type information for this field |
| Behavior | accessors | Access methods for FieldDef state |

PropSpec Definitions

| Class | Name | Description |
|---|---|---|
| TypedObject Spec 1205 | | Superclass of detailed type information |
| State | name | Name of field using this type |
| | length | Length of data used by this type |
| | description | Text that describes this field |
| | validators | List of Visitor classes that act as validation behaviors |
| Behavior | createTypedObjSpec | Create a TypedObjectSpec from a string descriptor array |
| | abbreviation | Get the appropriate abbreviation of this type |
| | clone | Make a copy of this TypedObjectSpec |
| | validateString | Validate a string to determine if it is consistent with this type |
| | valueOf | Answer the typed value of the specified string |
| IntegerSpec 1206 | | TypedObjectSpec subclass for whole numbers |
| State | defaultValue | Default value for uninitialized data |
| Behavior | | All inherited |
| NumberSpec 1207 | | TypedObjectSpec subclass for real numbers |
| State | defaultValue | Default value for uninitialized data |
| | precision | Number of places after a decimal point |
| Behavior | | All inherited |
| CharSpec 1208 | | TypedObjectSpec subclass for character data |
| State | defaultValue | Default value for uninitialized data |
| Behavior | | All inherited |
| DecimalSpec 1209 | | TypedObjectSpec subclass for fixed point numbers |
| State | | |
| | defaultValue | Default value for uninitialized data |
| | precision | Number of places after a decimal point |
| Behavior | | All inherited |
| DateSpec 1210 | | TypedObjectSpec subclass for ISO standard dates |
| State | defaultValue | Default value for uninitialized data |
| Behavior | | All inherited |
| TimeSpec 1211 | | TypedObjectSpec subclass for ISO standard times |
| State | defaultValue | Default value for uninitialized data |
| Behavior | | All inherited |
| TimestampSpec 1212 | | TypedObjectSpec subclass for timestamps |
| State | defaultValue | Default value for uninitialized data |
| Behavior | | All inherited |

Comments
1. The PropSpec class implements a Facade pattern, a pattern used to create a single interface to a number of collaborating classes.
2. The principle class in the PropSpec is the FieldGroupSpec. This class defines the characteristics of each "FieldGroup." A FieldGroup is a group of fields related by a common key definition. It is roughly analogous to the fields that would be on each logical page of a multi-page proposal document.
3. Notice in the Class Diagram that FieldGroupSpec recurses (it can include itself any number of times). It is this line that defines the n-level hierarchy of the proposal. The proliferation of FieldGroupSpecs is bounded by the min and max values which indicate how many times the current FieldGroupSpec can (or must) occur within its particular parent.
4. The recursive FieldGroupSpec structure is best implemented as a Composite pattern with companion Iterator.
5. FieldGroupSpecs contain many FieldDefs, each of which contain detailed information about one field in the FieldGroupSpec.
6. Terminology note: it will become clear when comparing this section to the next that a parallel set of class structures are defined for the actual elements that the PropSpec defines. We've attempted to keep the names parallel: a FieldGroupSpec defines the specifications of a FieldGroup; a FieldDef specifies the definition of a Field; and so forth.
7. Supplementary information is kept for fields that are keys. In the invention, a key is a field or group of fields that defines the uniqueness of a FieldGroup. Note that the KeyDef keeps track of whether a key field is "owned" by a parent FieldGroup. Parent ownership means that the particular key field in question is defined in the current FieldGroup or by one of its ancestors. Consider this example: We are currently modifying a SalesOrder proposal and are positioned to the second line item for. Product Sweeper of SalesOrderNo 1234. This particular FieldGroup has two keys SalesOrderNo and Product. Both keys are required, since neither alone would uniquely specify this FieldGroup. Product is defined "locally" to this group—thus it could be changed in the current FieldGroup. But SalesOrderNo is owned by a parent FieldGroup (OrderHeader) and can only be changed in the parent.

8. The TypedObjectSpec is the top of an inheritance structure that defines different basic types to the system. Currently seven types are provided. Users can easily extend these types by adding new classes to the system.

9. The PropSpec needs to "persist." This is covered under "Proposal Persistence" in the section that follows.

2. Acting as a Container for Proposal Data

Once metadata has been put into the Proposal to describe its application-dependent properties, it becomes possible to use the Proposal as a container for application data. Referring to FIG. 13, a class diagram shows the basic Proposal structure.

| Class | Name | Description |
| --- | --- | --- |
| Proposal 1301 | | Facade for all Proposal operations |
| State | currentFieldGroup | Current FieldGroup |
| | fieldState | Indicates whether key or nonKey fields are needed |
| | iterator | Current position in subsidiary FieldGroup composite |
| | overrideMode | Are errors in data forced in without interaction? |
| | tentativeInsertNode | If nonnull, node is still defining keys to execute an insert |
| | validateMode | Is data checked with special validation procedures? |
| Behavior | cancelInsert | Cancel the inflight tentative insert |
| | changeFieldState | Sets whether key or nonKey fields are asked for |
| | delete | Delete FieldGroup and its subordinates |
| | down | Proceed to first child FieldGroup |
| | find | Find a specified FieldGroup |
| | findFieldGroupSpec | Find a specified FieldGroupSpec |
| | first | Position to root FieldGroup |
| | flush | Flush all cached changed to FieldGroup |
| | getCurrentFieldGroup | Get currently positioned FieldGroup |
| | getField | Get specified Field |
| | getKeys | Get key Fields |
| | getOverrideMode | Get current override mode state |
| | getValidateMode | Gets the current validation mode |
| | insert | Insert a new FieldGroup |
| | insertableFrom | Determine all valid FieldGroupSpecs insertable from here |
| | insertComplete | Signal end of tentative insert mode |
| | last | Position to last FieldGroup in tree |
| | next | Position to next FieldGroup |
| | getnextInsertPoint | Determine next valid FieldGroupSpec insertable from here |
| | notifyChange | Signal external objects to a significant change of state |
| | positionTo | Position to specified FieldGroup |
| | previous | Position to previous FieldGroup |
| | redo | Redo the last undone version |
| | remapFields | Mutates FieldGroups if metadata has changed |
| | setCurrentFieldGroup | Sets the current FieldGroup |
| | setField | Sets the data value of a specified field |
| | setFields | Sets the data values of a list of fields |
| | setOverideMode | Sets the override mode |
| | toString | Renders the Proposal as a string |
| | undo | Undo a recent change |
| | up | Position FieldGroup to its parent |

| | | Proposal Definitions |
| --- | --- | --- |
| Class | Name | Description |
| FieldGroup 1302 | | Group of associated fields of data |
| Behavior | countOfChildren | Count the descendent FieldGroups of this FieldGroup |
| | equalsKeys | Tests for match of this FieldGroup's keys by a list of fields |
| | equalsFields | Tests for match on any specified fields |
| | getDirtyFields | Get list of recently changed fields |
| | getParentFieldGroup | Get FieldGroup that is parent to this |
| | isMaxExhausted | Do we move more than specified max of these FieldGroups |
| | unsatisfiedFields | Answer list of fields that are required but not entered |
| Field 1303 | | Field object |
| State | fieldDef | FieldDef that defines this particular field |
| | isInitialized | Has this field been entered yet? |

-continued

Proposal Definitions

| Class | Name | Description |
|---|---|---|
| | isDirty | Has this field been recently entered? |
| Behavior | equalsValue | Does this field's value match the specified value |
| | getFieldString | Get field value as a string |
| | isKeyField | Is this field a key field |
| | isRequired | Is this a required field |
| | notifyChanged | Notify with an Event that this field has changed |
| | validate | Apply validation behavior to check this field |
| TypedObject 1304 | | Superclass of typed data holder |
| Behavior | fromString | Convert value from a string representation |
| | getTypedObjectSpec | Get the underlying TypedObjectSpec for this object |
| | mutate | Convert value from another TypedObject with a different Spec |
| | setToDefault | Set to the prespecified default value |
| | toString | Convert value to a string |
| | validate | Execute any specified special validations |
| IntegerType 1305 | | TypedObject subclass for whole numbers |
| NumberType 1306 | | TypedObject subclass for real numbers |
| CharType 1307 | | TypedObject subclass for character data |
| DecimalType 1308 | | TypedObject subclass for fixed point numbers |
| DateType 1309 | | TypedObject subclass for ISO standard dates |
| TimeType 1310 | | TypedObject subclass for ISO standard times |
| TimestampType 1311 | | TypedObject subclass for timestamps |
| State | value | The stored value of this TypedObject |
| Behavior | | All inherited from (or overrides) TypedObject |

Comments

1. Notice the congruence between the PropSpec and Proposal classes. This congruence has been reflected in the naming conventions used (e.g., FieldDef and Field). Both support Facade patterns to encapsulate the PropSpec objects (in the former case) and the Proposal itself (in the latter case).
2. The Proposal is implemented as a Composite pattern with Iterator.
3. Proposal objects (like the PropSpec object) are 100% non-visual. While other components may act as viewers, these objects are built for quiet use. This is a major feature: It allows these objects to be accessed and manipulated by non-human automata as well as human-driven user interfaces.
4. The Proposal object makes extensive use of the currentFieldGroup. This term designates the FieldGroup that is the current focus of attention.
5. An extensive amount of special behavior is associated with inserting data into the Proposal hierarchy. This will be covered under "Insert Processing" below.
6. Once the data is inserted into the hierarchy, navigation is simply a matter of invoking the various iterator functions (up, down, next, previous, top, bottom).
7. OverrideMode is a Proposal attribute that can be set so that errors are accepted without any notification to the user. It is useful when a batch program or other non-human consumer wants to push data into a Proposal and have it reviewed later. When OverrideMode is on, the Proposal still performs the error checks and marks the Fields in error; it simply doesn't complain to the consumer about the error.
8. ValidationMode allows new data to be entered with no error checks at all. It is used to speed up loading of data that has already been validated by some other process.
9. The validate methods are used to fire Visitor objects. These are dynamically loaded validations written in a scripting environment that the user can supply.
10. Special processing associated with building the actual tree is covered in the subsequent section "Insert Processing."
11. Proposal state needs to be saved. This is covered in the section "Proposal Persistence" below.

Insert Processing

Inserting into a Proposal poses a greater challenge than all the other navigation operations combined. The reason is simple: Insert mode has the responsibility for properly shaping the multi-level FieldGroup tree, where other operations simply travel on an already-constructed shape.

Before describing the insert algorithms, it would be helpful to describe a sample application for use as a reference point. Consider a hypothetical sales order entry system. It consists of Order Header (customer info, shipping info)
    LineItems (product code, qty, amount—min=1, max=99)
        Shipment(shipQtyCommitment, shipDate—min 0, max 5)
    Special Instructions A given sales order in this sample:
- has one and only one header.
- must have at least one lineitem, and can have up to 99.
- can optionally have partial shipments, up to a max of 5, under each lineitem.
- can optionally have a single section of SpecialInstructions.

As this sample indicates, there are numerous points in the order entry sequence in which an operator may either want to proceed to the next logical step, or skip to the next type of FieldGroup (example: I've entered two Shipments under LineItem 1 and have no more to enter, so I now want to proceed to LineItem 2). The invention accordingly provides two different user interface events that signal these two different kinds of Insert: InsertOK and InsertCancel. These two events can be assigned to specific keyboard keys (the default is InsertOK is a FunctionKey12 and InsertCancel is Escape), or to UI widgets such as buttons or menu items.

InsertOK means to keep going "down" the tree (preorder traversal) until the max count is exhausted.

Examples

I've entered the Order Header; go to LineItem 1.

I've entered LineItem 1; go to Shipment 1.

I've entered Shipment 5; go to LineItem 2 (the max has been reached).

InsertCancel means to escape from the current path and try the next logical type Examples I've canceled from LineItem 2; go to SpecialInstructions.

I've canceled from Shipment 3; go to next LineItem.

An insert technique (in pseudocode) for implementing entry of this sample (or any other arbitrarily deep tree structure) is as follows:

Fgs=FieldGroupSpec
Fg=FieldGroup
if (Fg is empty)
    Insert(RootFieldGroupSpec)
    Return
If (InsertKey is InsertCancel) goto Cancel
If (current Fg's type has a descendent type) //e.g. LineItem has a Shipment
    Insert(Descendent Type)
    Return
If (current Fg's own type is not exhausted (exceeded max))
    Insert(Another Fg type) //e.g. Shipment follows Shipment
    Return;
Cancel:
    If (any peer type of this type in the Fgs (that is not exhausted))
        Insert(PeerType) //e.g. Item goes to SpecialInstructs
        Return
While (this node has a parent in the Fgs)
    Make parent node the current
    If (there is any child node that is non-exhausted)
        Insert(it)
    Keep trying until root
Stop trying . . . the Proposal is full.

Tentative Inserts

The algorithm specified above solves most of the problems relating to a Proposal insert. However, there is still one outstanding discrepancy. When a user decides on the node to insert there is still a gap between the time the new FieldGroup is created and the time that the keys that define this node's existence are specified. For example, a user might have executed an InsertCancel to finish work on LineItem 2 and now positions to LineItem 3. Until the full key is set (in this case OrderNo and Product) a canonic FieldGroup cannot be recognized by the Proposal object. This condition is called the Tentative Insert condition. The FieldGroup in this condition is called an "underspecified FieldGroup".

The Proposal object has several methods for dealing with Tentative Insert. When an underspecified FieldGroup is created, it is automatically flagged as such. As key fields are subsequently entered, the Proposal notes when key field collection has been completed. At this moment the Proposal internally switches gears from Tentative Insert into Full Insert mode. It also fires an event that any interested party can "hear," signaling the change in status of the Proposal.

An external consumer has the option to abandon a Tentative Insert by executing the cancelInsert method and moving on to the next available nodeType.

For example, consider the case where the user is at LineItem 2, Shipment 3. Hitting the first InsertCancel makes the Proposal object start a tentative insert at LineItem 3. But if there are no further lineitems, a subsequent InsertCancel moves the user on (without penalty) to the SpecialInstructions. Yet another InsertCancel terminates entry into the Proposal altogether. In each of these cases a Tentative Insert was initiated, canceled, then passed onto the next candidate type.

Proposal Persistence

The Proposal and PropSpec will need to be saved to some "external form" so that they can persist between sessions or when passed around to users on different platforms. Unfortunately there is still no standard, portable mechanism for storing in-memory objects onto an external form. There are many such mechanisms that are specific to a language or platform, and a Proposal implementer can choose any of these mechanisms that are convenient or available.

However, to satisfy those who need more options, the invention has defined its own formats for PropSpec and Proposal persistence. These storage models support all of the invention's features and functions described in this document.

In both the PropSpec and Proposal cases, the internal objects are converted into a standard textual representation that can be read and written on any computer that supports text. It can be stored on any medium, sent over any communication (it can even be printed out on one computer and rekeyed into another, though this is not a recommended method of Proposal transfer). Proposal persistence to text files and to a relational database come as built-in features; almost any other kind can be added to the framework.

The Proposal files can appear in two forms:

PropSpec file, which contains only information related to a single PropSpec

Proposal files, which contain all the information specific to a given Proposal, plus the PropSpec information that defines the Proposal.

Proposal Syntax

The following syntax definitions show how the Proposal and PropSpec state is formatted for persisting onto any external definition. These style of these definitions is rendered in a "relaxed" version of the standard Backus-Naur Form (BNF) that has been used for years to document the syntax of programming languages. A quick summary of this relaxed BNF is given below:

The left-justified word that begins each "paragraph" is the. name of the term being defined.

Italicized text represents the usage of a defined term or an informal comment that describes the usage of multiple terms (e.g., "One of the following").

Normal, non-italicized text represent the literal word used

A term is defined before it is used.

Words enclosed in angle-brackets (e.g., <fieldName>) are used merely to delimit terms in a context with intermixed terms or literals.

Proposal text:
    One or more PropBlocks
PropBlock:
Fields {FieldBlock}
FieldGroup {FieldGroupBlock}

```
Proposal {ProposalBlock}
FieldBlock:
    One or more FieldDefinitions
FieldDefinition:
    <fieldName>,<typeDefinition>,<lengthSpecifier>,
        <descriptionString>,
    <default>,<validatorList>;
[Note: all zones after typeDefinition are optional]
fieldName:
    A fieldName with leading letter,
    Followed by letters, digits, or '_'
TypeDefinition:
    One of the following:
        Int
    Num
    Dec
    Char
    Date
    Time
    Timestamp
    <UserDefinedType>
UserDefinedType:
    A string with a Visitor object defined to implement type behavior
Length Specifier:
Either:
    Whole number that represents external length
    Real number that represents <length>,<precision>
Default:
    Default value of appropriate type
ValidatorList:
    [validators | <validator1> . . . <validatorN>]
Validator:
    [<validatorProcedure> | Zero or more args separated by semicolons]
PropBlock:
    <specifier1> = <specValue1>;
        . . .
    <specifierN> = <specValueN>;
    [fields | <fieldUse>;fieldUseN>]
    [subFieldGroups | <subFieldGroup>;<subFieldGroupSpec>]
    [assumptions | <assumption>;<assumptionN>]
Specifier:
    One of the following:
        Domain              [Note: Backend resource name]
        InteractionMode     [Note: Default interaction mode]
        <userdefinedvalue>
SpecValue:
    Appropriate value for specifier
FieldUse:
    <FieldIdentifierInContext>,req [Note: 'req' presence is optional]
FieldIdentifierInContext:
    *fieldName    [Note: indicates a key field]
    fieldName     [Note: indicates a nonkey field]
SubFieldGroupSpec:
    [<subFieldGroupName> |
<subFieldGroup Type> (<keyfields-comma-delimited>);
<min>;<max>;<interactionMode>]
InteractionMode:
    One of the following:
        Null      Exists
        Default   Update
        New       Delete
Assumption:
    <fieldGroupName>,<fieldName-or-list>,<commitAction>,
        <notifyAction>,<fixupAction>
Action:
    <same format as Validator>
    [Note: Name of visitor that defines that action]
ProposalBlock:
    <specifier1> = <specValue1>;
        . . .
    <specifierN> = <specValueN>;
<fieldGroupBlock>
    <versions>
fieldGroupBlock:
    [<fieldGroupName> | <fieldContent>; <fieldContentN>;
<fieldGroupBlock>]
    [Note: internal <fieldGroupBlock> is optional]
fieldContent:
    <fieldValue> [@fldNote| <name>;<time>;<noteString>]
        [@fldErrs | #<id>; <errorcodeMessage>]
        [Note: fldNote & fldErrs are optional depending on their existence]
versions:
    [@commands | #<id>; <action>; <fieldGroup>; <fieldName>;
        <keys>; <oldFields>; <newFields>;
        <note>; <positionToPlace>]
keys:
    List of comma-delimited fieldnames that are the keys
<oldFields> <newFields>
    <fieldName> = <fieldValue>,
    <fieldNameN> = <fieldValueN>
```

Sample Proposal

This Sample Proposal is in external form. It is composed of fragments of the file. It is semantically incomplete. Its purpose is to demonstrate the syntax.

```
fields collected {
    empId,num,6;
    name,char,20;
    addrType,char,8;
    street1,char,30;
    street2,char,30;
    city,char,20;
    state,char,2;
    zip,num,5;
    emailService,char,15;
}
fieldGroup Employee {
    domain=PersonDomain;
    interactionMode=New;
    [fields|*empId,req;name]
    [subFieldGroups|[HomeAddress|HomeAddress(empId,*);1;1;default];
[OtherAddress|OtherAddress(empId,*);0;*;default];
[EmailAddress|EmailAddress(empId,*);0;3;default];
[Education|Education(empId,*);1;*;default];
[WorkHistory|WorkHistory(empId,*);0;*;default];
[Club|Club(empId,*);0;*;default];
]}
fieldGroup HomeAddress {
    domain=Address;
    interactionMode=New;
    [fields|*empId,req;*addrType,req;street1;street2;city;state;zip]
}
fieldGroup OtherAddress {
    domain=Address;
    interactionMode=New;
    [fields|*empId,req;*addrType,req;street1;street2,,
[validators|[Policy.RangeCheck|90000;99999]];city;state;zip,,
[validators|[Policy.RangeCheck|90000;99999]]]
}
fieldGroup EmailAddress {
    domain=Email;
    interactionMode=Update;
    [fields|*empId,req;*emailService,req;email]
}
Proposal this {
    highCommandId=0;
    highErrorId=2;
[Employee|1234;John Tibbetts;
[HomeAddress|1234;Home;289 Douglass St;;San Francisco;CA;94114;]
[OtherAddress|1234;Mom's;42240 Parm Ave:77777
[@fldErrs|[#1|street2 value of 77777 is below min value 90000]];
Mission San Jose;CA;66538
[@fldErrs|[#0|zip value of 66538 is below min value 90000]];]
[OtherAddress|1234;Vacation;999 Mountain
Road[@fldNote|Default;970324.123121;teststreet1];;Santa
Cruz[@fldNote|Default;970324.123113;tescity
];CA;95432[@fldNote|Default;970324.123102;test zip];]
[EmailAddress|1234;Internet;john@kinexis.com;]
[EmailAddress|1234;AOL;johntib@aol.com;]
[Education|1234;Bellarmine;9Q59;6Q63;
[Course|1234;Bellarmine;LibEd;Liberal Ed;]
[Course|1234;Bellarmine;Judo;Judo;]]
```

-continued

```
[Education|1234;LoyolaU;9Q70;6Q71;
[Course|1234;LoyolaU;Engr;Electrical Engineering;]]
[WorkHistory|1234;Tymshare;9Q71;8Q76;
[JobTitle|1234;Tymshare;Application Consultant;]
[JobTitle|1234;Tymshare;TASC Sales;]
[JobTitle|1234;Tymshare;Regional Tech Manager;]]
[WorkHistory|1234;Noesis;9Q76;3Q81;
[JobTitle|1234;Noesis;Vice President;]]
[WorkHistory|1234;Datalex;3Q81;8Q87;
[JobTitle|1234;Datalex;President;]
[JobTitle|1234;Datalex;Chief Technology Officer;]]
[WorkHistory|1234;Kinexis;9Q87;12Q99;
[JobTitle|1234;Kinexis;President;]]
[Club|1234;OS/2 User;Evangelist;]]
[@commands|
[#0|970324.123101;101;OtherAddress;zip;
[keys|1234;Vacation];;;[note|Default;970324.123102;test zip];;]
[#1|970324.123113;101;OtherAddress;city;
[keys|1234;Vacation];;;[note|Default;970324.123113;tescity
];;]
[#2|970324.123121;101;OtherAddress;street1;
[keys|1234;Vacation];;;[note|Default;970324.123121;teststreet1];;]]
}
```

3. Keeps Versions of Itself

There are two quite distinct advantages to having a Proposal keep versions of itself.

Undo/Redo

A Proposal can use the version list to undo actions that have been previously accepted. Further, a Redo operation can allow "undone" operations to be redone. These two operations let an end-user can scroll back and forth through previous versions of the Proposal to position on the exact candidate version from which he would like to continue.

Auditing

Since a Proposal can be passed among numerous parties during its life span, it is useful to be able to examine the Proposal later in its life to see exactly who was responsible for what changes in the Proposal.

With respect to FIG. 14, a class diagram shows the Version classes for a Proposal 1401.

The granularity of Proposal version control is at the FieldGroup level. For example, a user who changes three fields in LineItem 2 generates a single version entry for Updating a LineItem.

Logged changes record only fields that are relevant to a change. In the example above, only the three updated fields are logged, not the fields that remained the same.

The version contains both the values before and after the change. This allows complete ability to undo or redo without reconstructing context.

The signature field is a holder for any implementer-defined object or objects that identify the consumer making the change. This field can be as minimal as a character string that holds the person's name or as complete as a fully-constituted encrypted digital signature that could support high reliability and non-repudiation needs.

Version information persists with the Proposal object. Even if the Proposal is routed to another user and reentered on another day, all of the previous versions are still available for either undo/redo or auditing purposes.

4. Retains and Tracks Errors

A conventional transactional system rejects errors immediately. Incorrect or incomplete data will not even make it through the user interface, and usually terminates the transactional conversation.

But with Proposals as part of the system, errors can be accepted, held, and monitored. The Proposal signals immediately that a field has been filled in with erroneous or incomplete information, then gives the user the option of fixing or retaining it. If the error is retained, the Proposal tracks it so that it can be found and resolved later. All errors must be eliminated before the Proposal turns into a transactional request at submission time.

| Class | Name | Description |
|---|---|---|
| CommandVector 1402 | | Collection of all versions |
| State | Commands | Collection of all versions |
| Behavior | Add | Add a new command to the list |
| | GetLast | Get the last command from the list |
| | removeAbove | Prune all commands above a specified version number |
| | removeLast | Remove the last command from the list |
| Command 1403 | | A command that creates a particular version |
| State | timeStamp | Timestamp for when this version was created |
| | signature | Identification of consumer that created this version |
| | action | Type of action that created version (eg. Insert, Delete, Update) |
| | keys | Keys that identify the FieldGroup this action works on |
| | oldValues | Old values in FieldGroup before version change |
| | newValues | New values in FieldGroup after version change |
| Behavior | execute | Execute the action of this command |
| | unExecute | Reverse the action of this command |

Comments

The overall design of Versions is implemented with the Command pattern. This pattern records actions performed by some agent. Playing these actions backwards yields "undo;" replaying them forward yields "redo." Notice that the naming convention follows the Command pattern usage even though the elements end up representing Proposal versions.

For example, an international Purchase Order Proposal object might signal an error if the end-user requests the shipment of a certain technology that cannot be legally exported. The user can continue to work on the Proposal, and route it later to a specialists in export policy who can perform a more informed fixup.

Referring to FIG. 15, a class diagram shows the Error class.

| Class | Name | Description |
|---|---|---|
| Error 1501 | | Error object |
| State | id | Unique identifier for this error |
| | code | Application defined error code |
| | message | Application defined error message |

Comments

Error messages can be associated with any of three tiers in a Proposal: the Proposal object 1502 itself, each FieldGroup 1503, or each Field 1504 within each FieldGroup. This allows errors to be owned by their proper domain. For example, an error message signaling an invalid zip code would be associated with the faulty zip field, while a credit limit failure on the whole purchase order would be associated the Proposal object itself.

Any number of error messages can be associated with any of the available slots.

Error messages are saved with the Proposal object. Thus they can be retained across sessions and routed to other consumers of this object.

5. Hold Annotations

Annotations are similar to error objects, except they contain informational notations rather than error messages. They can be used to record a user's notes to himself or to colleagues, giving instructions for the Proposal, making comments, suggestions, explanations or justifications.

With respect to FIG. 16, a class diagram shows the Note class for a Proposal 1602 with FieldGroup 1603 and Field 1604.

| Class | Name | Description |
|---|---|---|
| Note 1601 | | Note object |
| State | timestamp | Date and time of annotation |
| | username | User who left the note |
| | note | Content of the message |

Comments

The annotation is signed and time-stamped. This positions it relative to the other Proposal activity.

Annotations make version entries. They are audited just as data changes are. They can also be undone/redone.

The preceding sections have reviewed the characteristics of the non-visual Proposal facade and the PropSpec, its metadata framework. The next sections discuss how these objects communicate with the outside world.

6. Interacts with a Variety of Consumers

This section deals with the collaboration between the Proposal and the front end. The front end can be any type of consumer interface technology, but it is typically a graphical user interface or Web browser.

The Proposal interface documented in section 2 above satisfies most consumer-interface needs. With these components a GUI widget, for example, can access a field value from the Proposal object and display it. Conversely, a button-press will cause a FieldGroup to be deleted.

However, additional consumer interfaces may be needed.

Proposal Event Structure

This is the primary additional interface required. It allows the Proposal object to notify interested external parties about change in its internal state. Notification is accomplished via the Observer pattern (also called Publish-Subscribe).

Consider this example: a user is using a ChangeOrder Proposal that will allow a change to be made to an existing order. He has entered the SalesOrderNo and the Proposal has accessed a database to populate its internal Field objects. Now the Proposal needs to notify various UI elements that the data has changed so that they will now display the populated values. It does this by firing the FIELDGROUP_CHANGED event.

| | |
|---|---|
| PROPOSAL_INIT | A Proposal instance has been just created |
| PROPOSAL_CHANGED | A data field has changed value |
| FIELDGROUP_ADDED | A FieldGroup insert or append has been done |
| FIELDGROUP_REMOVE | A FieldGroup has been deleted |
| FIELDGROUP_ENTRY | Proposal navigation has entered a FieldGroup |
| FIELDGROUP_EXIT | Proposal navigation has exited a FieldGroup |
| FIELDS_CHANGED | A group of Fields has changed |
| FIELD_CHANGED | A specific Field has changed |
| FIELDSTATE_CHANGED | Internal entry requirements (fieldState) changed |
| FIELDGROUPCHGPEND | Get ready for FieldGroup switch |
| KEYS_NEEDED | Keys needed in FieldGroup |
| KEYS_RESOLVED | Keys have just been satisfied |
| NONKEYS_NEEDED | Non keys needed |
| POPULATE_FIELDGROUP | Populate fieldGroup |
| COMMIT_FIELDGROUP | Commit fieldGroup |

UICoordinator

The Proposal event structure is sufficient to provide a two-way interface between a consumer component and the Proposal. However, since it is common in GUI front-ends to tie many components to a "model" object (the Proposal is a kind of model object), it is desirable to have a flexible mechanism for binding these components to the Proposal. The UICoordinator provides this additional level of functionality.

Specifically, UICoordinator provides these features:

The UI components have a single point to register their interest in a proposal.

The component can specify which types of Proposal events it is interested in tuning in on (event filtering).

The component can further specify which particular Proposal fields it is interested in observing. The coordinator will only notify of change to that particular field.

The Coordinator can "autoregister" many components.

"Autoregistration" needs additional explanation. Registration is the process by which a component makes itself known to the coordinator. In certain environments, it would be desirable for this registration to happen automatically.

Consider a visual builder that constructs a GUI from "Proposal-aware" components. A coordinator might be dragged onto the visual palette to act as the intermediary for all activity between the Proposal and its components. These components—also dragged on to the GUI by developer—may number in the dozens: pushbuttons, fields, fieldPanels, labels, etc. All will need registration to the coordinator. In most GUI environments this represents separate gestures that "link" the coordinator to the component.

Autoregistration is the aspect of this system that automatically provides the linkage, assuming there is no ambiguity. The coordinator initiates autoregistration after all the components have had a chance to register manually. It visits its parent "container" and takes a scan at all its descendents; in a GUI this means it asks its parent window for a list of all descendents. It then goes through each, spots the "Proposal-aware" ones (that is, the candidates for registration), then invites each to dynamically register.

The table below shows the interactions between component, coordinator, and Proposal.

| Proposal | Coordinator | A Component |
|---|---|---|
| | | Initialize: An external component initializes. It sends the Coordinator register method |
| | Register: Coordinator invokes the Component register method | |
| | | Register: Component answers with a detailed list of which Proposal event it's interested in. |
| | Autoregister: Coordinator checks around its GUI "neighborhood" (searches all components that are children of my parent container) and reminds still unregistered components to register | |
| Notify: Proposal fire Proposal-level Event (any event above except FIELD_CHANGED) | | |
| | Update: Coordinator notifies all component who've registered interest in specific | |
| NotifyField: Proposal fires Field-level event (FIELD_CHANGED) and cities particular field | | |
| | UpdateField: Coordinator notifies all components interested in particular field | |

7. Knows How to Interact with Server

The last section examined how the Proposal interacts with the front end. Now we examine how it will interact with the back end.

The back end is where the managed resource (usually data but sometimes data and behavior) lives. This is a typically some sort of database, transaction processing environment, or more recently, object environment. In all of these cases the Proposal architecture "proposes" and the backend "disposes" of the Proposal.

The invention provides a separate interface for each of three styles of back end "resource coordinator." All three of these ResourceCoordinators share a common superclass.

In most operating environments a particular user would only use one of these three back end alternatives, depending on the needs and legacy of his system architecture.

To allow for a Proposal conversation to reach all the way from Proposal to ultimate resource, the invention implements two translation stages: low-level, which links Backend Coordinator to ResourceCoordinator, and high-level, which links Proposal to Backend Coordinator.

Low-level translation—BackendCoordinator to ResourceCoordinator

The low-level translation provides the mapping between the BackendCoordinator 1702 and the diverse backend resource types. Internally the BackendCoordinator issues its request to the subclasses using a standard set of inputs:

Type of low-level operation being performed
  1. Select—read data by keys from the resource
  2. Insert—insert data into the resource
  3. Update—update resource data that matches the key
  4. Delete—delete resource data that matches the key
FieldGroup being worked on
List of fields manipulated To make sense of how we can map these operations to the lower-level resources requires that we understand more about the precise interface style of each resource.

Referring to FIG. 17, in very general terms, these three backend ResourceCoordinators represent the three ways that any client can interact with any server through the Proposal 1701 and the Backend Coordinator 1702

Data-oriented interface (DBCoordinator) 1703
  Used with a database backend.
  Interaction is characterized by a standard data manipulation operation on specified data.
Function-oriented interface (TPCoordinator) 1704
  Used with any kind of function-oriented server (TP monitor, RPC, DCE, etc.).
  Interaction is characterized by a verb (function to be invoked) and arguments to the function.
Object-oriented interface (OOCoordinator) 1705
  Used with an interface to any OO environment.
  Interaction is characterized as a message with arguments sent to a particular object that interprets the message in its own particular way.

The following table summarizes how the inputs listed at the top of the page match the particular characteristics of each ResourceCoordinators.

| | DBCoordinator | TPCoordinator | OOCoordinator |
|---|---|---|---|
| Operations | Operations directly equal SQL verbs | Operation is param to FunctionMapper | Operation dictates choice of object resolution |
| FieldGroups | FieldGroup equals relational table | FieldGroup is param to FunctionMapper | FieldGroup equals target class |
| Fields | Fields equal relational fields | Fields are input to DataMapper | Fields match accessor methods |

Comments on the DBCoordinator Column

This is the simplest form of back end mapping. BackendCoordinator operations exactly match the SQL DML verbs, FieldGroups=Tables, Fields=fields Comments on the TPCoordinator Column This is the most complex form of back end mapping. There are no standards whatsoever for implementing business function in a function-oriented server (such as a TP monitor).

The FunctionMapper is a Visitor object (user-supplied class) that takes two inputs: Action and FieldGroup. These two inputs are used to compute the server function to be executed; for example, Operation Select on FieldGroup Employee might compute a result that is ReadEmployeeData. The actual method of computation is left up to each installation of the invention. A simple form might be a two dimensional array that fills in all possible functionNames for each of the four operations and all the FieldGroups. Alternatively, a more architected solution would be to support invention-compatible naming conventions that would simply map to something like SelectEmployee. This last solution makes the FunctionMapper trivial but assumes that the server behavior has been explicitly modified for the invention.

The DataMapper is a Visitor object that maps input arguments and return values (resultsets). The values that are passed (or returned) are simply lists of Field objects. For example, a TerminateEmployee might define the Field object EmployeeNumber and TerminationDate. The DataMapper allows these fields to be converted to the appropriate values that interface to the signature of the TerminateEmployee transaction. Like the FunctionMapper above, the DataMapper is user-supplied. It can be complex if it is interfacing to a server that has no previous knowledge of the invention. Conversely, if field arguments are architected to match between the resource and the invention, the DataMapper might do nothing at all.

Comments on the OOCoordinator Column

The OOCoordinator falls somewhere between the previous two in terms of complexity. Depending on the outcome of Business Object standards they could quite readily become as trivial as the DBCoordinator.

Two of the three interface categories (FieldGroup becomes class; Field becomes accessor) provide a simple interface, assuming that the backend implementation has conformed to the standards outlines above.

The Action operation depends on currently non-standardized object instantiation and access rules. Various ObjectDatabase technologies resolve these issues with propriety command sets. Failing that, an object implementer can use the Flyweight pattern to implement conformant activity.

Action mapping involves using the keys for the object Logical Object ID (LOID).

The actions correspond to:
1. select—access an object in domain space by keys (LOID)
2. insert—instantiate an object with keys=LOID
3. update—modify the object with keys=LOID
4. delete—stop referencing object with keys=LOID High-Level Translation—Proposal to BackendCoordinator The high-level translation converts the more coarse-grained Proposal operations into the finer-grained low-level operations seen above.

The high-level resource operations that the Proposal uses are the following:

Populate

Populate is used when a FieldGroup needs its data fields filled. For example, a MeritIncrease proposal might take an EmployeeId and look up relevant employee info (e.g., Name and CurrentSalary) and fill it in to the FieldGroup.

Commit

Commit is used when a consumer has indicated that a Proposal is ready to be transacted. The FieldGroups data is then moved over to the BackendCoordinator.

Validate

Validate is used immediately before the commit (or earlier in a Proposal life if the consumer wishes) to validate that the data currently held in the Proposal is still current with the data that is kept on the server.

The order of invocation of these operations is qualified by a parameter in the FieldGroupSpec class of the PropSpec called InteractionMode. The InteractionMode defines the context of the resource action sufficient to allow the BackendCoordinator to translate it into the appropriate low-level actions.

The values of the InteractionMode are:

InteractionMode: New
   This FieldGroup subtree is "New" to the resource.
   It requires that at populate time it does not preexist in the resource.
   It requires that at commit time it can be inserted in the resource.

InteractionMode: Exists
   This FieldGroup subtree currently "Exists" in the resource.
   It requires that at populate time it preexists in the resource.

InteractionMode: Update
   This FieldGroup subtree is going to be "Updated" in the resource.
   It requires that at populate time it preexists in the resource.
   It requires that at commit time it is updated in the resource.

InteractionMode: Delete
   This FieldGroup subtree is going to be "Deleted" from the resource.
   It requires that at populate time it preexists in the resource.
   It requires that at commit time it will be committed.

InteractionMode: <user-defined>
   A user-defined InteractionMode has been defined.
   It will be implemented by a Visitor pattern (user-exit).

Notice from the PropSpec Class Diagram that each FieldGroup of the PropSpec tree has its own value for InteractionMode. While it is most common for all the FieldGroups in a PropSpec to have the same InteractionMode (e.g., all parts of an OrderEntry Proposal object are "New"), it is sometimes useful to have mixed subtrees of InteractionMode usage (e.g., an ExtendSubscription Proposal (IM: New) may include an optional AddressChange (IM: Update) subtree).

The following tables show the full set of interactions for Proposal activity interacting with the back end. There is one table for each of the predefined InteractionModes. Note that a particular user can define his own table for highly-specialized InteractionModes.

(Note: Where the diagrams below refer to "Event: Validate", this deals with the optimistic concurrency control that is discussed in the next section. See the next section for details.)

| | InteractionMode: New | |
|---|---|---|
| Consumer | Proposal | BackendCoord |
| Starts work on a new Proposal | | |
| | Event: NEEDS_KEY | |
| Supplies keys | | |
| | Event: Populate | |
| | | Select from FieldGroup by keys |

-continued

| InteractionMode: New | | |
|---|---|---|
| Consumer | Proposal | BackendCoord |
| | | If EXISTS, raise error ELSE sets FieldGroup to DefaultValues for Fields |
| | Event: NEEDS_NONKEY | |
| Supplies data Commit | | |
| | Event: Commit | |
| | | Insert FieldGroup |
| Proceed to children and continue | | |

| InteractionMode: Exists | | |
|---|---|---|
| Consumer | Proposal | BackendCoord |
| Starts work on "Exists" proposal | | |
| | Event: NEEDS_KEYS | |
| Supplies keys | | |
| | Event: Populate | |
| | | Select FieldGroup by keys If NOTEXIST, raise error ELSE fill in fields with selededed data |
| | Event: HAS_NONKEYS Fills in Proposal data | |
| Commit | | |
| | Event: Validate | |
| Proceed to Children and continue | | |

[Note: Exists is similar to Update except that is for read-only data. It still performs optimistic checks (if specified in the Assumptions-see next section)]

| InteractionMode: Update | | |
|---|---|---|
| Consumer | Proposal | BackendCoord |
| Starts work on "Update" proposal | | |
| | Event: NEEDS_KEYS | |
| Supplies keys | | |
| | Event: Populate | |
| | | Select FieldGroup by keys If NOTEXIST, raise error ELSE fill in fields with selededed data |
| | Event: HAS_NONKEYS Fills in Proposal data | |
| Modifies data Commit | | |
| | Event: Validate Event: Commit | |
| | | Update FieldGroup |

-continued

| InteractionMode: Update | | |
|---|---|---|
| Consumer | Proposal | BackendCoord |
| Proceed to Children and continue | | |

| InteractionMode: Delete | | |
|---|---|---|
| Consumer | Proposal | BackendCoord |
| Start work on "Delete" proposal | | |
| | Event: NEEDS_KEYS | |
| Supplies keys | | |
| | Event: Populate operation | |
| | | Select FieldGroup by keys If NOTEXIST, raise error ELSE fill in fields with selededed data |
| | Event: HAS_NONKEYS Fills in Proposal data | |
| Reviews delete in context Commit | | |
| | Event: Validate Event: Commit | |
| | | Delete FieldGroup |
| Proceed to Children and continue | | |

8. Protects Against Stale Data

The invention's design creates a potential data integrity problem that must be guarded against. In many cases, data will be removed from the datastore (via a Populate) and stored for some period of time in the Proposal itself. This time period can be a few seconds, or it can be several weeks or months. During this period, the data back on the server might change while, of course, the replicated data in the Proposal would not. This mismatch could cause data corruption when the Proposal is eventually submitted and the data rewritten. Even without such a possibility (as in InteractionMode: Exists), the data the user is working on is still "stale".

The invention resolves this problem with a well-documented technique usually called either "optimistic concurrency control" or "optimistic locking ". However, the invention's approach is unusual in the following ways:

The approach builds the supplementary information needed to perform reasonable optimistic techniques right into the PropSpec 1801 technique as seen in FIG. 18.

A variety of recovery mechanisms are designed into the architecture.

The advantages to this approach are the following:

Optimistic concurrency control typically requires significant application design and implementation work. By building in the structure of the solution, the invention makes most if not all of this work unnecessary carriage return.

In cases where supplementary behavior is required (e.g., a Fixup Visitor), the user needs only to supply the particular algorithm. The rest of the concurrency framework is already in place.

This approach does a much better job of resolving the "data interference" that stale data causes. Typically, optimistic techniques are used in the databases and their replicas. The problem with this approach is that, by the time the data is put into the database, it is a mere artifact of the data interference event that caused it. In the invention, however, the optimistic recovery environment is encapsulated within the event itself that knows the reason for the change. This is called "proximate intentionality". The closer a fixup method can be to the source of the problem, the better the chance of fixing it correctly. For example, an address change that has grown stale might be resolved differently depending on whether: a) parking spaces are being reassigned, b) the employee has died, or c) insurance renewal notices are about to be sent out.

To implement optimistic techniques, the invention defines a set of objects called "Assumptions." They establish what is assumed to be consistent between the datastore and the Proposal replica. They also contain information that defines the disposition when a failure in the assumption is detected.

With respect to FIG. 18, a class diagram shows the Assumptions class, and a FieldGroupSpec 1803.

| Class | Name | Description |
| --- | --- | --- |
| Assumptions 1804 | | Specification of optimistic concurrency constraints |
| State | fieldList | List of fields to watch for stale data |
|  | abortCommit | Should data interference cause the commit to abort |
|  | notifyParty | Name or address of party to notify on data interference |
| Behavior | detector | Custom behavior to detect stale data |
|  | notifier | Custom behavior to notify the notifyParty |
|  | fixup | Custom behavior to attempt repair of stale data |
| Pouch 1805 | | Container of optimistic concurrency values |
| State | fieldGroup | FieldGroup instance this valueSet applies to |
|  | keys | Field values of key fields for the fieldGroup |
|  | originalFields | Original fields values of fieldGroup at Populate time |

Comments

Assumptions are associated with the FieldGroup. Notice that the Assumption processing is fired when the high-level Validate resource operation is fired (see previous section).

Though not shown in the interaction diagrams, a consumer can choose to invoke Validate any time in the life of a Proposal. While it must be fired during Commit processing (in the relevant InteractionModes), it can optionally be fired earlier to ensure that the data being worked on has not gotten stale.

The original values of a FieldGroup (those that specified in the fieldList of the Assumptions) are retained in a special container object called the Pouch. This is required because the user could be making modifications in the very Proposal fields that need to be used subsequently to check currency.

The default interference check is to check all fields in the datastore against all the matching fields in the Proposal. The <fieldList>value in the Assumption metadata allows a subset of fields to be checked. For example, in a well-architected system only a timestamp need be checked against the data that the Proposal holds.

The default detect algorithm is to check that the value of the datastore data equals the value of the Proposal data. A user can configure other detection methods using a Visitor (e.g., in a temporal database, ensure that a date is within a datastore date range).

AbortCommit is a flag that indicates whether or not commit processing should proceed when stale data has been detected.

The Notifier is a Visitor that provides a mechanism for notifying the NotifyParty parameter that interference has happened. This notification could be any specified technique (a system alert, an email, a console message to an operator, etc.). NotifyParty is an opaque object used to provide whatever information is necessary to execute the Notifier.

Fixup is a Visitor that provides a user-defined fixup procedure. For example, a common fixup might be LastUpdaterWins (compare replica with datastore; update with the later timestamp begins canonic).

Some Proposals may be processed very quickly and not required Optimistic Concurrency Control. A Proposal Policy Visitor can specify user-defined locking policies. (e.g., Use standard (pessimistic) database locks until the user decides to "disconnect" from the server. Then switch to optimistic).

The combination of the above techniques provides an enormous amount of flexibility. Essentially the developer can choose what combination of commit processing, notification, and fixup will happen for each instance of stale data is noticed.

Tools

Proposal Builder

The ProposalBuilder has four tabbed panels on which a developer enters the specifications (PropSpec) for the new Proposal he wishes to build.

Panel 1: Defining the Field Dictionary

The field dictionary is the container that holds field definitions that are common across all Proposals in any Proposal family. These field definitions are stored in a text file FIELDS.DCT that exists in a repository subdirectory. Many such subdirectories can exist, each containing any number of PropSpecs.

Referring to FIG. 19, the top three fields in the ProposalBuilder are outside of the tabbed space and contain information common to the whole PropSpec. They are:

Repository 1901

The name of the subdirectory that contains the field dictionary file and all the PropSpec files that are associated with any family of Proposals. This "family" is heuristically defined as all proposals that share some common set of field definitions. For example, one repository might contain HR Proposals and another the Football Pool Proposals.

Proposal Name 1902

This is the file name of the PropSpec that we are currently working on. It contains all the elements associated with a single Proposal. A Proposal can be of virtually any size. For example, a tax form with its many required and optional supporting schedules could be a single Proposal.

Proposal Policy 1903

This is the name of a Java class that can implement user defined behavior that is common to any part of this proposal. There is more information about such Policy classes in the Validator section below.

Dictionary 1904

The Dictionary page contains information about the fields common to all Proposals in this family. This field information can be entered manually or automatically generated by preparing the appropriately formatted FIELDS.DCT file.

Now we turn to the tabbed fields.

The Fields Listbox 1905 on the left side of the page contains a summary of all the fields defined. Selecting any particular field will display its detailed metadata in the field on the right side (the field "zip" has been selected in the screenshot). Here they can be viewed or modified. New fields can be added by entering new field information and pressing the Update button. The Remove button removes the field.

The FieldName 1906 is the name of this field. It can be any sensible length, alphanumeric with no embedded spaces.

The Type field 1907 allows the selection of any predefined Proposal type. Currently types are limited to Integer, Numeric, and Character. New types are easily added to the framework by merely adding a new class per type. For example, we might want to add Money, Date, or BookIdentifier. The concept of Proposal type is implemented as a Strategy pattern.

The Size field 1908 gives the length of the field. It is usually an integer, though some types—Numeric, for example—can accept a decimal point (e.g. 9.2). The whole part represents the whole length with a decimal precision of the fractional part.

The Default field 1909 gives the value that the field will assume before any data is entered.

The Description field 1910 contains a more explanatory string than the FieldName. It can also be used for automatically creating GUIs.

The Validators listbox 1911 contains a list of all the validators that associated with this field. A validator is Java behavior that applies user-defined editing to some part of the proposal. Note that this validator will be fired wherever this field is used regardless of how many PropSpecs it is used in. (This differs from the "field use" validators below which are only applied in a specific Proposal.) For example, a Dictionary validator that applies PositiveOnly to Zip means that all zips must be positive numbers. In certain proposals we may want to further reduce Zip to a more constrained set.

Here is an example of the Java source for a validator:

```
package Policy;
import Proposal.Proposal;
public class RangeCheck extends Validator {
    public void validate(Proposal proposal,
                String fieldName, String fieldValue,
                String[] args)
        throws PolicyException {
        double bottom = Double.valueOf(args[0]).doubleValue();
        double top = Double.valueOf(args[1]).doubleValue();
        double value = Double.valueOf(fieldvalue).doubleValue();
        if (value < bottom) {
            throw new PolicyException(
                fieldName
                + "value of"
                + fieldValue
                + "is below min value"
                + bottom);
        }
        if (value > top) {
            throw new PolicyException(
                fieldName
                + "value of"
                + fieldValue
                + "is above max value"
                + top);
        }
    }
}
```

Panel 2: Defining the Proposal Strucuture

A Proposal is a composed of a hierarchy of sections called FieldGroups. Each FieldGroup is associated with some flattened sets of fields in the same logical domain. The Structure page defines the detailed structure of the proposal. Note that this information is used at runtime to provide automatic navigation of the Proposal.

With respect to FIG. 20, the centerpiece of the Structure page 2001 is a hierarchic tree view of the PropSpec 2002. Notice that some of the FieldGroups (each line of the tree view) are descendents of the root node (e.g. an Employee has a HomeAddress and Education information). Other FieldGroups are descendents of the descendents (e.g. Education is composed of many Course FieldGroups).

Selecting a FieldGroup displays the detail of the field group in the entry fields at the bottom where they can be viewed or edited.

Lists of the key fields 2003 and nonKey fields 2004 appear on the bottom right but not editable (until the next page). The concept of key fields is essential to managing the Proposal architecture. A key field is that field or set of fields that defines the uniqueness of the fieldgroup. This is analogous to the formal relational use of "key". Notice that the key field names are included in the tree view, providing a quick view of the domain structure of the Proposal.

The tree can be restructured with the buttons on the top right. AddChild 2005 allows the addition of new child fieldgroup to any node. InsertPeer 2006 inserts a new fieldgroup in front of the one currently selected. Delete 2007 eliminates the selected node (and all its descendents). Combinations of these buttons can create any logical tree structure.

The Name field 2008 specifies the unique name of this fieldgroup.

Domain 2009 specifies some logical grouping of each of these fields. This field is used by BackEndCoordinator. If the Proposal framework is talking to a relational database this might be the name of the table that is being operated on. If an object backend, it might be the container of objects that are logically grouped together. If a TP monitor, it might be the name of the function to invoke fields of this kind.

Min 2010 and max 2011 specify the cardinality of the FieldGroup. A min of 0 means the FieldGroup is optional. A max of "*" means that any number of FieldGroups can be entered or maintained. Specific constraints come in the form: min=3 & max=6.

InteractionMode 2012 determines the pattern of interaction between Proposal and BackEndinterface. It is this field that parameterizes the type of conversation that takes place between the Proposal and backend.

FieldGroup Policy 2013 specifies any Java Visitor code that might be useful in working on this FieldGroup.

Panel 3: Defining the Field Use

Once a FieldGroup exists fields (both key and nonkey) need to be added to it and subsequently maintained. Referring to FIG. 21, the Fields page 2101 performs this manipulation.

The FieldGroup 2102 shows which FieldGroup is presently being worked on. This FieldGroup value is not editable. The FieldGroup shown here is the one that is selected on the previous page.

The center listbox 2103 contains all the fields in the field dictionary (the first page) in alphabetical order. If a needed field has not been entered, a user can return to the Dictionary page, enter it, and flip back.

The arrow buttons add (left-pointing) 2104 or delete (right-pointing) 2105 field definitions to either the pool of Key Fields 2106 or NonKey Fields 2107. On an add, if no target field is selected, the field as appended to the end. If a target field is selected, the added field is inserted at that position.

The top key field 2110 in the screen shot is surrounded by braces to show that it is inherited from the parent FieldGroup and cannot be removed to except by flipping to the parent FieldGroup removing it there.

The ProposalBuilder stays aware of certain constraints in field placement. For example, data fields cannot be put before key fields, nor can local keys be put in front of inherited keys.

The Field Details field 2108 provides a quick summary of the attributes of the field.

The Field Validators 2109 specify Java Visitor objects that add user-defined validation. As above, any validator that is inherited from the field dictionary is shown in brackets and cannot be removed (except by removing it from the dictionary). New validators can be added that are only applied to the use of "zip" (in this example) in this particular PropSpec and FieldGroup. Notice that the MessageLine (at the bottom) reports that the requested Policy.SFCountyOnly class could not be found by the ProposalBuilder. This is simply a warning to the builder that this object could not be found in the development environment. It still builds the ValidatorCommand (ValidatorCommands are implementations of the Command pattern) object that will invoke the validator at runtime. If the class cannot be found at runtime, the entry data can still be forced into the Proposal; an error will be noted.

Panel 4: Defining the PropSpec Assumptions

The Assumptions section defines the rules for detecting and correcting stale data in the Proposal.

Stale data can occur when a Proposal replicates data from an authorized datastore and works on this data over time. The underlying data back in the datastore may change in the interim, so that the assumptions that the Proposal is working on are no longer current. The discrepancy creates obvious problems at commit time.

A Proposal object does not necessarily need to go through a stale-data analysis before it commits. It is possible to configure a Proposal to perform standard pessimistic concurrency control (implemented by locks), so that as soon as the Proposal is instantiated at populate time, the data is locked until the subsequent update. In this mode the Proposal is merely acting as a smart forms system. This is fine for those Proposals that will be converted to transactions immediately.

However, a Proposal that will be long-lived—deferred, routed, pended, etc.—cannot keep the data locked for hours, days or weeks. It will need to deal with the possibility of stale data by using optimistic concurrency control.

The Proposal object itself does not change depending on whether it is using pessimistic or optimistic locking. This locking mode is merely a mode of operation. The consumer may begin pessimistically but switch (releasing locks) to optimistic when he decides that the operation will take longer than anticipated. Proposals can be configured to switch mode based on application context or user gestures. The end-user will not need to know anything about the details of these issues.

With respect to FIG. 22, a screenshot is shown that is an example of the capabilities of Assumptions.

The Domain column 2201 shows which Domain (as entered in the Structure section) is being checked.

The Field column 2202 specifies the target of the staleness check: a field, list of fields, or no field. The field(s) specified will be compared with the datastore before the commit to see if they are still current (that is, if they hold the same values as in the PropSpec). A particularly good idea is to check a TimeStamp field in the datastore (if it is built with one).

The Detect field 2203 allows the placement of a Java Visitor to further analyze the staleness check.

The Commit Field 2204 indicates whether a commit should be attempted even if stale data is found.

The Notify Field 2205 defines a Java Visitor that will notify someone (somehow) that stale data has been identified.

The Correct or Fixup Field 2206 is a Java Visitor that will attempt to fix the stale data. For example, LastUpdaterWins could resolve data interference in favor of the most recent occurrence.

Of course, these can be used in many different combinations. Some data elements may work well with a combination of Commit with a simple Fixup and a notification to a relevant overseer. Certain standard strategies will be built into the framework.

ProposalViewer

The ProposalViewer is a simple Proposal editor. It can view and manipulate all aspects of any Proposal object the moment the object is created. It can be used for simple applications, or those that need to be used immediately. It is ideal as a Proposal "inspector."

Referring to FIG. 23, an example screen shot of the ProposalViewer is shown.

A standard menu frame surrounds this viewer. New Proposals can be created, read or saved using the standard commands of the file menu.

The Proposal field 2301 at the top left is the name of the PropSpec being used for this Proposal.

The TreeView 2302 is similar to that in the ProposalBuilder. But real Proposal data has an extra degree of dimensionality, the repeating data itself. The actual FieldGroup instances are shown with their instantiated keys as the nodes of the tree. Selecting or scrolling through the treeview causes the position of the data to change.

The fields on the left 2303 are dynamically constructed as each FieldGroup type changes. The labels shown are the fieldNames. Descriptions can also be specified.

Notice that there are two small buttons to the right of every field. These buttons are for Notes (top button) 2304 and ErrorMessages (bottom button) 2305. They change color to yellow and red if there is content. Depressing the button brings up a pop-up list of notes or errors.

The arrow buttons 2306 provide another way to move through the Proposal. The buttons are generally similar to a VCR toolbar. The double up-arrow goes to the root position.

Undo/Redo 2310, 2311 will cause the Proposal to walk backward or forward (through previous Undos) all the way back to the beginning of the Proposal's history. FIG. 23 also shows a Delete button 2307, a Trace button 2309, and a Commit button 2308.

The Override checkbox 2312 indicates whether the Proposal is in Override mode. In Override, erroneous data entry is immediately entered (with the errors caught and marked). With Override off, a popup asks whether an erroneous data element should be kept, changed, or returned to its original value.

Further Customization

Most applications that use the invention will want their own, programmer-built "composed views" of Proposals on the front end. There are already several ways to approach add custom U.I.s.

Custom Programming to the Proposal Facade Application Programming Interface (API)

Since the Proposal is a completely nonvisual object it can be used with any kind of user interface—visual or nonvisual, interactive or batch, GUI, Web browser, etc. In this mode, the surrounding application code must be able to talk directly to Java.

Using the Proposal Component Interface

Since the Proposal API is also wrapped as a component (bean), it can be accessed by any application or development environment that supports construction from parts. Kinexis has built a preliminary set of beans (see below) for Proposal-based visual construction.

Using an ORB

The Proposal object will support an ORB wrapping. Then it can be accessed by any CORBA-compatible object environment written in any language on any machine.

Components

The Proposal toolkit includes a starter set of Proposal-aware components for use in Java visual development environments. All are currently implemented as transitional beans under the Symantec Visual Pro development environment. These concepts should extend reasonably well to other bean-based development environments as well as to subsequent versions of beans. In this document Visual Pro tools are rendered to give an idea of the development capability.

With respect to FIG. 24, a screenshot shows an example of the Proposal Toolbar 2401.

Each of the icons is a separate component that will be discussed separately.

Proposal Component

The primary component is a wrapper for the Proposal object itself. This is a non-visual component (it has no runtime appearance). It encapsulates the full data and metadata of the currently-loaded Proposal object. All other objects need to connect ("register") with this component in order to have a source for their intelligence.

Registration can happen in two ways. The developer can draw a link between the Proposal component and some other component. This method is very precise because it explicitly states the connection. However it can be tedious if there are many components to register.

Alternatively, in many cases the components will "autoregister". Autoregistration means that at startup time the Proposal component will seek and demand allegiance of any recognizable component contained in any descendent of its own containment.

As an example of autoregistration, a developer may decide to drag a Proposal component onto a visual palette. He may then drag on a Proposal Label object and set the label property to ProposalName. When the Proposal component is loaded the label will be set to the Proposal name. No registration is required.

Autoregistration will not work when:

there are multiple Proposals in the same container. Note, though, that by multiple Proposals, we mean cases where the application is dealing with multiple Proposal objects simultaneously. Any number of Proposals can be dealt with serially by the same Proposal component. For example, the application may be a compare utility between two selected Proposals.

components are in completely different container hierarchies. It may be desirable to have a "Remote Control" toolbar that floats anywhere on the Desktop in its own frame. This window still needs to find the Proposal that it is bound to. Consequently, it will take explicit development-time registration to bind these components together.

Session Manager

This component is currently a simple one. It encapsulates the UserName of the current user. Proposal components registered with this component will "log in" their Proposal to this user for all subsequent updates to that Proposal. (Updates to a Proposal are logged to a user on a per-field basis).

Proposal Label

This read-only label object places various internal values of the Proposal on the UI. Which of these values is used is set as a Label property. The Proposal Label can assume values for:

| | |
|---|---|
| ProposalName | Name of the current proposal |
| FieldGroupName | Name of the current field group |
| FieldName | Name of the current field |
| ProposalErrors | Number of errors in this proposal |
| FieldGroupErrors | Number of errors in this fieldgroup |
| FieldErrors | Number of errors in this field |
| ProposalNotes | Number of notes in this proposal |
| FieldGroupNotes | Number of notes in this fieldgroup |
| FieldNotes | Number of notes in this field |
| Etc. | |

Proposal Arrow Buttons

Referring to FIG. 25, Proposal Arrows are used to control the movement through a proposal tree. The button uses properties to transform itself into one of the six built-in buttons

| | |
|---|---|
| LeftArrow 2503 | Previous fieldgroup |
| RightArrow 2504 | Next fieldgroup (preorder traversal) |
| UpArrow 2501 | Go to parent of this node |
| DoubleLeft 2502 | Go to the root node |
| DoubleRight 2505 | Go to the end node |
| DownArrow | Go to first child of current |

Note that each button is a different instance of the same component.

The arrow on the button is dynamically painted. Thus the button can be stretched and sized to any possible rectangular shape.

Proposal TreeView

This a type of Panel that displays a tree rendering of the current Proposal. Selecting or scrolling through the tree changes the Proposal position. With respect to FIG. 26, an example of a Proposal tree view 2601 is shown.

Proposal Action Button

These components are pushbuttons that send action requests into the Proposal. Referring to FIG. 27, an example of a Proposal Action Button configured to perform an Undo 2701 is shown.

These actions buttons are governed by a property that configures which action they will eventuate:

| | |
|---|---|
| OK | Accept the changes in this fieldgroup |
| Cancel | Escape from the entry context of this fieldgroup |
| Override | Force in the error on the currently active field |
| Insert | Find the next insert point and ready the fieldgroup |
| Delete | Delete the fieldgroup |
| Undo | Walk back the undo change |
| Redo | Redo undone changes |

Setting the action property will also change the button label accordingly.

Proposal Checkbox

With respect to FIG. 28, a Proposal Checkbox 2801 will enable or disable some Proposal option. Currently only one option is enabled:

Override Forces all errors into immediate entry (recording the error)

Proposal Message Area

The Proposal Message Area is a TextArea that acts as a log that displays any Proposal errors These can include:

Semantic navigation errors (e.g., at end of Proposal)

Data entry error messages

Problems opening or closing the Proposal

Any uncaught Java exception

Proposal Field

Referring to FIG. 29, the Proposal field object 2901 is a control that is used for displaying and entering data from a particular field of a particular FieldGroup of the Proposal.

The buttons on the right side of the field indicate the presence of a Note (top button) 2902 or Error (bottom button) 2903. These buttons will turn Yellow or Red respectively. Pressing the button will display a pop-up for viewing and maintaining Notes or Errors.

All field views governed by a Proposal component are coordinated by an Observer on the Proposal. This ensures that all updates to a Proposal field are instantly updated by all viewers.

Proposal Field Panel

This component is a dynamically constructed panel of all the fields in the current proposal fieldgroup. There are a number of properties which govern this panel's behavior:

Whether key, nonKey, or all fields are displayed

Whether key, nonKey, or all fields are editable

Various formatting characteristics

Are prompts formed by fieldName or Descriptions

With respect to FIG. 30, an example of a sample use of a field panel 3001 is shown.

Note that the fields (e.g., 3002, 3003, 3004, 3005, 3006, 3007, and 3008) in the field panel are not standard field objects, they are PropField objects (see ProposalField).

Also note that all field views governed by a Proposal component are coordinated by an Observer on the Proposal. This ensures that all updates to a proposal field are instantly updated by all viewers.

Adapting the Framework

Writing a program to manipulate a Proposal

The invention supports a framework of classes for manipulating all aspects of Proposals, their data, metadata, etc.

Most simple proposal access is through a single class named Proposal, Proposal acts as a facade (the Facade pattern) for typical proposal manipulation behavior.

The following simple program creates a Proposal and puts some data in it.

The Proposal metadata is specified in a preexisting PropSpec file (that may have been built with the ProposalBuilder). String data is put in through a simple data structure called a StringVector (a Vector with both label and value fields). There are actually several ways that data can be put into a Proposal.

The individual Proposal methods are documented in JavaDoc format.

The program is as follows:

```
import Proposal.*;
import PropSpec.*;
import PropUtil.*;
import CompositePattern.*;
import TypedObject.*;
public class TestProposal3 {
    public static void main(String[] args)
        throws PropSpecException,
        ProposalException,
        TypedObjectException,
        LabeledVectorException {
        //Logs on user
        PropSystemObject pso = PropSystemObject.getDefault();
        pso.setUserName("jjt");
        Proposal proposal;
        //Build proposal object from PropSpec in args
        proposal = Proposal.BuildProposal(args);
        //Force in any errors
        proposal.setOverrideMode(true);
        //Create stringVector for top fieldgroup
        StringVector mailTo =
            new StringVector("name,address1,address2,city,state.,zip");
        //Insert top fieldgroup
        mailTo.parseStringValues("john,289 Fern St,,Oakland,CA,94114");
        proposal.insert("MailTo", mailTo);
        //Create stringVector for children
        StringVector sub = new StringVector("name,phone,email");
        //Insert children
        sub.parseStringValues("john,555-1212,john@kinexis.com");
        proposal.insert("subMail", sub);
        sub.parseStringValues("john,800-1212,jt@kinexis.com");
        proposal.insert("subMail", sub);
        //write out to System.out
        System.out.println(proposal.toString());
    }
}
```

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for converting a transaction submission process into a reusable, generic transaction-formation object, said object mediating between a front-end and a back-end of a transactional application in a computer environment, and said object including a plurality of components defined by metadata, said process comprising the steps of:

defining a set of specifications for each of the components;

creating said object by using a combination of said specifications to instantiate the transaction submission process; and providing a back-end interface, wherein said object transmits data to at least one of a plurality of back-end resources through said back-end interface, said specifications defining a hierarchy of domain relationships, interaction modes, and assumptions.

2. The process of claim 1, further comprising the step of providing said user interfaces and said components by default, wherein said coordinator communicates with said user interfaces.

3. The process of claim 1, further comprising the step of providing said user interfaces that are user-defined, wherein said coordinator communicates with said user interfaces.

4. The process of claim 1, further comprising the step of said coordinator communicating with user interfaces selected from a group consisting of an Internet Interface, Graphical User Interface (GUI), Object Oriented User Interface (OOUI), proprietary interface, bar code readers and keypads.

5. The process of claim 1, further comprising the step of providing a specification builder tool to create said specifications.

6. The process of claim 1, further comprising the step of said back-end interface communicating with said back-end resources selected from a group consisting of Database Management Systems, Transaction Processing Monitors, and Object Oriented Databases.

7. The process of claim 1, further comprising the step of selectively coupling said back-end interface to any of said back-end resources to thereby allow said object to be interrupted, temporarily pended, routed to another party, worked on overtime, and accessed for resumption of processing of the transaction submission process.

8. The process of claim 1, further comprising the step of selectively coupling said object to any of said user interfaces to thereby allow said object to be interrupted, temporarily pended, routed to another party, worked on over time, and accessed for resumption of processing of the transaction submission process.

9. The process of claim 1, wherein said object is self aware and navigates between pages and skips to appropriate fields automatically.

10. The process of claim 1, further comprising the step of said object supporting n-level undo/redo of versions of any of said data.

11. The process of claim 1, further comprising the step of said object allowing a user to add, change, and annotate any of said data.

12. The process of claim 1, further comprising the step of said object tracking
versions of updates made to any of said data in said object, and
an identity of a user providing said updates.

13. The process of claim 1, further comprising the step of said object including data security selected from a group consisting of authorization, authentication, and digital signatures.

14. The process of claim 1, further comprising the steps of said object:
accepting and recording messages originating external to the object relating to errors in the object;
tracking said errors for resolution thereof; and
managing and resolving said errors prior to said transaction submission process being completed.

15. The process of claim 1, further comprising the steps of said object:
recognizing any of said data that has become stale data; and
providing user options for responding to said stale data, said user options being selected from a group consisting of user correction, rule based correction, and error flagging.

16. The process of claim 1, further comprising the step of structuring said object as a quantified hierarchy tree with cardinality.

17. The process of claim 1, further comprising the step of providing a simple component-based assembly process for creating and customizing said user interfaces.

18. The process of claim 1, further comprising the step of providing a standard default visual editor for said object.

19. An apparatus for converting a transaction submission process into a reusable, generic transaction-formation object, said object mediating between a front-end and a back-end of a transactional application in a computer environment, and said object including a plurality of components defined by metadata, comprising:
a module for defining a set of specifications for each of the components;
a module for creating said object by using a combination of said specifications to instantiate the transaction submission process; and
a module for providing a back-end interface, wherein said object transmits data to at least one of a plurality of back-end resources through said back-end interface,
said specifications defining a hierarchy of domain relationships, interaction modes, and assumptions.

20. The apparatus of claim 19, further comprising a module for providing said user interfaces and said components by default, wherein said module for coordinating user interfaces communicates with said user interfaces.

21. The apparatus of claim 19, further comprising a module for providing said user interfaces that are user-defined, wherein said module for coordinating user interfaces communicates with said user interfaces.

22. The apparatus of claim 19, wherein said module for coordinating user interfaces communicates with user interfaces selected from a group consisting of an Internet Interface, Graphical User Interface (GUI), Object Oriented User Interface (OOUI), proprietary interface, bar code readers and keypads.

23. The apparatus of claim 19, further comprising a module for providing a specification builder tool to create said specifications.

24. The apparatus of claim 19, wherein said back-end interface communicates with said back-end resources selected from a group consisting of Database Management Systems, Transaction Processing Monitors, and Object Oriented Databases.

25. The apparatus of claim 19, wherein said back-end interface is selectively coupled to any of said back-end resources to thereby allow said object to be interrupted, temporarily pended, routed to another party, worked on overtime, and accessed for resumption of processing of the transaction submission process.

26. The apparatus of claim 19, wherein said object is selectively coupled to any of said user interfaces to thereby allow said object to be interrupted, temporarily pended, routed to another party, worked on over time, and accessed for resumption of processing of the transaction submission process.

27. The apparatus of claim 19, wherein said object is self aware and navigates between pages and skips to appropriate fields automatically.

28. The apparatus of claim 19, wherein said object supports n-level undo/redo of versions of any of said data.

29. The apparatus of claim 19, wherein said object allows a user to add, change, and annotate any of said data.

30. The apparatus of claim 19, wherein said object tracks
versions of updates made to any of said data in said object, and
an identity of a user providing said updates.

31. The apparatus of claim 19, wherein said object includes data security selected from a group consisting of authorization, authentication, and digital signatures.

32. The apparatus of claim 19, wherein said object
accepts and records messages originating external to the object relating to errors in the object,
tracks said errors for resolution thereof, and manages and resolves said errors prior to said transaction submission process being completed.

33. The apparatus of claim 19, wherein said object recognizes any of said data that has become stale data, and provides user options for responding to said stale data, said user options being selected from a group consisting of user correction, rule based correction, and error flagging.

34. The apparatus of claim 19, wherein said object is structured as a quantified hierarchy tree with cardinality.

35. The apparatus of claim 19, further comprising a module for providing a simple component-based assembly process for creating and customizing said user interfaces.

36. The apparatus of claim 19, further comprising a module for providing a standard default visual editor for said object.

37. A program storage medium readable by a computer, tangibly embodying a program of instructions executable by the computer to perform method steps for converting a transaction submission process into a reusable, generic transaction-formation object, said object mediating between a front-end and a back-end of a transactional application in a computer environment, and said object including a plurality of components defined by metadata, said method steps comprising:
   defining a set of specifications for each of the components;
   creating said object by using a combination of said specifications to instantiate the transaction submission process; and
   providing a back-end interface, wherein said object transmits data to at least one of a plurality of back-end resources through said back-end interface,
   said specifications defining a hierarchy of domain relationships, interaction modes, and assumptions.

38. The method of claim 37, further comprising the step of providing said user interfaces and said components by default, wherein said coordinator communicates with said user interfaces.

39. The method of claim 37, further comprising the step of providing said user interfaces that are user-defined, wherein said coordinator communicates with said user interfaces.

40. The method of claim 37, further comprising the step of said coordinator communicating with user interfaces selected from a group consisting of an Internet Interface, Graphical User Interface (GUI), Object Oriented User interface (OOUI), proprietary interface, bar code readers and keypads.

41. The method of claim 37, further comprising the step of providing a specification builder tool to create said specifications.

42. The method of claim 37, further comprising the step of said back-end interface communicating with said back-end resources selected from a group consisting of Database Management Systems, Transaction Processing Monitors, and Object Oriented Databases.

43. The method of claim 37, further comprising the step of selectively coupling said back-end interface to any of said back-end resources to thereby allow said object to be interrupted, temporarily pended, routed to another party, worked on over time, and accessed for resumption of processing of the transaction submission process.

44. The method of claim 37, further comprising the step of selectively coupling said object to any of said user interfaces to thereby allow said object to be interrupted, temporarily pended, routed to another party, worked on over time, and accessed for resumption of processing of the transaction submission process.

45. The method of claim 37, wherein said object is self aware and navigates between pages and skips to appropriate fields automatically.

46. The method of claim 37, further comprising the step of said object supporting n-level undo/redo of versions of any of said data.

47. The method of claim 37, further comprising the step of said object allowing a user to add, change, and annotate any of said data.

48. The method of claim 37, further comprising the step of said object tracking
   versions of updates made to any of said data in said object, and
   an identity of a user providing said updates.

49. The method of claim 37, further comprising the step of said object including data security selected from a group consisting of authorization, authentication, and digital signatures.

50. The method of claim 37, further comprising the steps of said object:
   accepting and recording messages originating external to the object relating to errors in the object,
   tracking said errors for resolution thereof; and
   managing and resolving said errors prior to said transaction submission process being completed.

51. The method of claim 37, further comprising the step of structuring said object as a quantified hierarchy tree with cardinality.

52. The method of claim 1, further comprising the step of providing a simple component-based assembly process for creating and customizing said user interfaces.

53. The method of claim 37, further comprising the step of providing a standard default visual editor for said object.

54. The process of claim 1, further comprising the step of using a coordinator for coordinating user interfaces with said object by
   mapping user input fields to said components associated therewith,
   accepting data in the user input fields, said data originating from users at the front end,
   converting the data in said input fields to said components associated therewith, said user interfaces for viewing contents of the transaction submission process, and
   outputting data from said object.

55. The process of claim 54, further comprising the step of organizing said data into a group consisting of user input fields, field groups, and additional reusable, generic transaction-formation objects.

56. The process of claim 1, wherein each of said back-end resources corresponds to a resource coordinator, said process further comprising the steps of organizing data into fields and grouping these fields into field groups, each said field group operating to exchange said data with at least one of said back-end resources through said back-end interface by
   determining from the object a first operation that governs the exchange of data with at least one of the back-end resources,
   determining from each of said field groups an interaction mode by which that field group exchanges data with at least one of the back-end resources,
   determining a second operation to be implemented by a resource coordinator, said second operation being a function of said first operation and said interaction mode, identifying from said second operation a particular back-end resource which exchanges said data with the field group, implementing the first operation so that the particular resource coordinator associated with said particular back-end resource exchanges said data with the field group, and implementing the second operation so that said particular back-end resource exchanges said data with said particular resource coordinator.

57. The process of claim 56, further comprising the step of selecting said first operation from a group consisting of Populate, Commit, Verify, and Check Assumptions.

58. The process of claim 1, further comprising the step of said specifications defining validation references.

59. The apparatus of claim 19, further comprising a module for coordinating user interfaces with said object by mapping user input fields to said components associated therewith, accepting data in the user input fields, said data originating from users at the front end, converting the data in said input fields to said components associated therewith, said user interfaces for viewing contents of the transaction submission process, and outputting data from said object.

60. The apparatus of claim 59, wherein said data is organized into a group consisting of user input fields, field groups, and additional reusable, generic transaction-formation objects.

61. The apparatus of claim 19, wherein each of said back-end resources corresponds to a resource coordinator, said apparatus organizing data into fields and grouping these fields into field groups, each said field group operating to exchange said data with at least one of said back-end resources through said back-end interface by determining from the object a first operation that governs the exchange of data with at least one of the back-end resources, determining from each of said field groups an interaction mode by which that field group exchanges data with at least one of the back-end resources, determining a second operation to be implemented by a resource coordinator, said second operation being a function of said first operation and said interaction mode, identifying from said second operation a particular back-end resource which exchanges said data with the field group, implementing the first operation so that the particular resource coordinator associated with said particular back-end resource exchanges said data with the field group, and implementing the second operation so that said particular back-end resource exchanges said data with said particular resource coordinator.

62. The apparatus of claim 61, wherein said first operation is selected from a group consisting of Populate, Commit, Verify, and Check Assumptions.

63. The apparatus of claim 19, wherein said specifications further define validation references.

64. The method of claim 37, further comprising the step of using a coordinator for coordinating user interfaces with said object by mapping user input fields to said components associated therewith, accepting data in the user input fields, said data originating from users at the front end, converting the data in said input fields to said components associated therewith, said user interfaces for viewing contents of the transaction submission process, and outputting data from said object.

65. The method of claim 64, further comprising the step of organizing said data into a group consisting of user input fields, field groups, and additional reusable, generic transaction-formation objects.

66. The method of claim 37, wherein each of said back-end resources corresponds to a resource coordinator, said method further comprising the steps of organizing data into fields and grouping these fields into field groups, each said field group operating to exchange said data with at least one of said back-end resources through said back-end interface by determining from the object a first operation that governs the exchange of data with at least one of the back-end resources, determining from each of said field groups an interaction mode by which that field group exchanges data with at least one of the back-end resources, determining a second operation to be implemented by a resource coordinator, said second operation being a function of said first operation and said interaction mode, identifying from said second operation a particular back-end resource which exchanges said data with the field group, implementing the first operation so that the particular resource coordinator associated with said particular back-end resource exchanges said data with the field group, and implementing the second operation so that said particular back-end resource exchanges said data with said particular resource coordinator.

67. The method of claim 66, further comprising the step of selecting said first operation from a group consisting of Populate, Commit, Verify, and Check Assumptions.

68. The method of claim 37, further comprising the step of said specifications defining validation references.

69. The method of claim 37, further comprising the steps of said object:

recognizing any of said data that has become stale data; and providing user options for responding to said stale data, said user options being selected from a group consisting of user correction, rule based correction and error flagging.

70. The process of claim 55, further comprising the step of providing introspective control for automatically determining characteristics of said metadata, making decisions based on said characteristics, and navigating among said input fields, field groups and objects.

71. The apparatus of claim 60, further comprising providing introspective control for automatically determining characteristics of said metadata, making decisions based on said characteristics, and navigating among said input fields, field groups and objects.

72. The method of claim 65, further comprising the step of providing introspective control for automatically determining characteristics of said components, making decisions based on said characteristics, and navigating among said input fields, field groups and objects.

73. The process of claim 1, further comprising the step of said object transmitting the data to asset managers through the back-end interface.

74. The apparatus of claim 19, wherein said object transmits the data to asset managers through the back-end interface.

75. The method of claim 37, further comprising the step of said object transmitting the data to asset managers through the back-end interface.

* * * * *